United States Patent
Cheng et al.

(10) Patent No.: US 11,443,243 B2
(45) Date of Patent: *Sep. 13, 2022

(54) METHOD AND SYSTEM FOR ARTIFICIAL INTELLIGENCE MODEL TRAINING USING A WATERMARK-ENABLED KERNEL FOR A DATA PROCESSING ACCELERATOR

(71) Applicant: Baidu USA LLC, Sunnyvale, CA (US)

(72) Inventors: Yueqiang Cheng, Sunnyvale, CA (US); Yong Liu, Sunnyvale, CA (US)

(73) Assignees: BAIDU USA LLC, Sunnyvale, CA (US); KUNLUNXIN TECHNOLOGY (BEIJING) COMPANY LIMITED, Beijing (CN)

( * ) Notice: Subject to any disclaimer, the term of this patent is extended or adjusted under 35 U.S.C. 154(b) by 413 days.

This patent is subject to a terminal disclaimer.

(21) Appl. No.: 16/598,151

(22) Filed: Oct. 10, 2019

(65) Prior Publication Data

US 2021/0110312 A1  Apr. 15, 2021

(51) Int. Cl.
*G06N 20/10* (2019.01)
*H04L 9/32* (2006.01)
(Continued)

(52) U.S. Cl.
CPC ............. *G06N 20/10* (2019.01); *G06F 15/80* (2013.01); *G06F 21/16* (2013.01); *G06N 20/00* (2019.01);
(Continued)

(58) Field of Classification Search
CPC ........ G06N 20/00; G06N 20/10; G06N 20/20; G06F 15/80; G06F 21/16; G06F 21/602;
(Continued)

(56) References Cited

U.S. PATENT DOCUMENTS

| 9,996,891 B2 | 6/2018 | Wang et al. |
| 2012/0072731 A1* | 3/2012 | Winograd ............. G06F 21/606 713/176 |

(Continued)

OTHER PUBLICATIONS

Uchida et al., Embedding Watermarks into Deep Neural Networks, Jun. 6-9, 2017, ACM, Proceedings of ICMR '17, 269-277 (Year: 2017).*

(Continued)

*Primary Examiner* — Shane D Woolwine
(74) *Attorney, Agent, or Firm* — Womble Bond Dickinson (US) LLP

(57) ABSTRACT

In one embodiment, a computer-implemented method performed by a data processing (DP) accelerator, includes receiving, at the DP accelerator, first data representing a set of training data from a host processor; receiving, at the DP accelerator, a watermark kernel from the host processor; and executing the watermark kernel within the DP accelerator on an artificial intelligence (AI) model. The watermark kernel, when executed, is configured to: generate a watermark, train the AI model using the set of training data, and implant the watermark within the AI model during training of the AI model. The DP accelerator then transmits second data representing the trained AI model having the watermark implanted therein to the host processor. In an embodiment, the method further includes receiving a pre-trained AI model and the training is performed for the pre-trained AI model.

21 Claims, 21 Drawing Sheets

(51) Int. Cl.
 *G06N 20/00* (2019.01)
 *G06F 21/16* (2013.01)
 *G06F 15/80* (2006.01)
 *G06F 21/60* (2013.01)
 *H04L 9/08* (2006.01)

(52) U.S. Cl.
 CPC .......... *H04L 9/3239* (2013.01); *H04L 9/3247* (2013.01); *G06F 21/602* (2013.01); *G06F 2221/0733* (2013.01); *H04L 9/0897* (2013.01); *H04L 2209/125* (2013.01); *H04L 2209/16* (2013.01)

(58) Field of Classification Search
 CPC .......... G06F 2221/0733; H04L 9/3239; H04L 9/3247; H04L 9/0897; H04L 2209/16; H04L 2209/125
 See application file for complete search history.

(56) References Cited

U.S. PATENT DOCUMENTS

| | | | |
|---|---|---|---|
| 2018/0189642 | A1 | 7/2018 | Boesch |
| 2018/0341495 | A1 | 11/2018 | Culurciello |
| 2019/0080239 | A1 | 3/2019 | Yang |
| 2019/0121671 | A1 | 4/2019 | Guim Bernat |
| 2019/0205508 | A1 | 7/2019 | Poddar |
| 2019/0294955 | A1 | 9/2019 | Uchida |
| 2019/0312772 | A1 | 10/2019 | Zhao |
| 2019/0325302 | A1 | 10/2019 | Savic |
| 2019/0354896 | A1 | 11/2019 | Kobayashi |
| 2019/0362232 | A1 | 11/2019 | Nagai |
| 2019/0370440 | A1 | 12/2019 | Gu |
| 2019/0385268 | A1* | 12/2019 | Kurin ................. H04N 1/32352 |
| 2020/0193274 | A1 | 6/2020 | Darvish Rouhani et al. |
| 2020/0380145 | A1* | 12/2020 | Van Oldenborgh ..... G06N 3/08 |
| 2021/0019605 | A1 | 1/2021 | Rouhani |
| 2021/0034721 | A1 | 2/2021 | Bos |
| 2021/0034788 | A1 | 2/2021 | Savagaonkar |
| 2021/0067842 | A1 | 3/2021 | Revital |

OTHER PUBLICATIONS

Ribeiro et al., MLaaS: Machine Learning as a Service, 2015 IEEE (Year: 2015).

Adi et al., Turning Your Weakness Into a Strength: Watermarking Deep Neural Networks by Backdooring, USENIX Association, 2018 (Year: 2018).

* cited by examiner

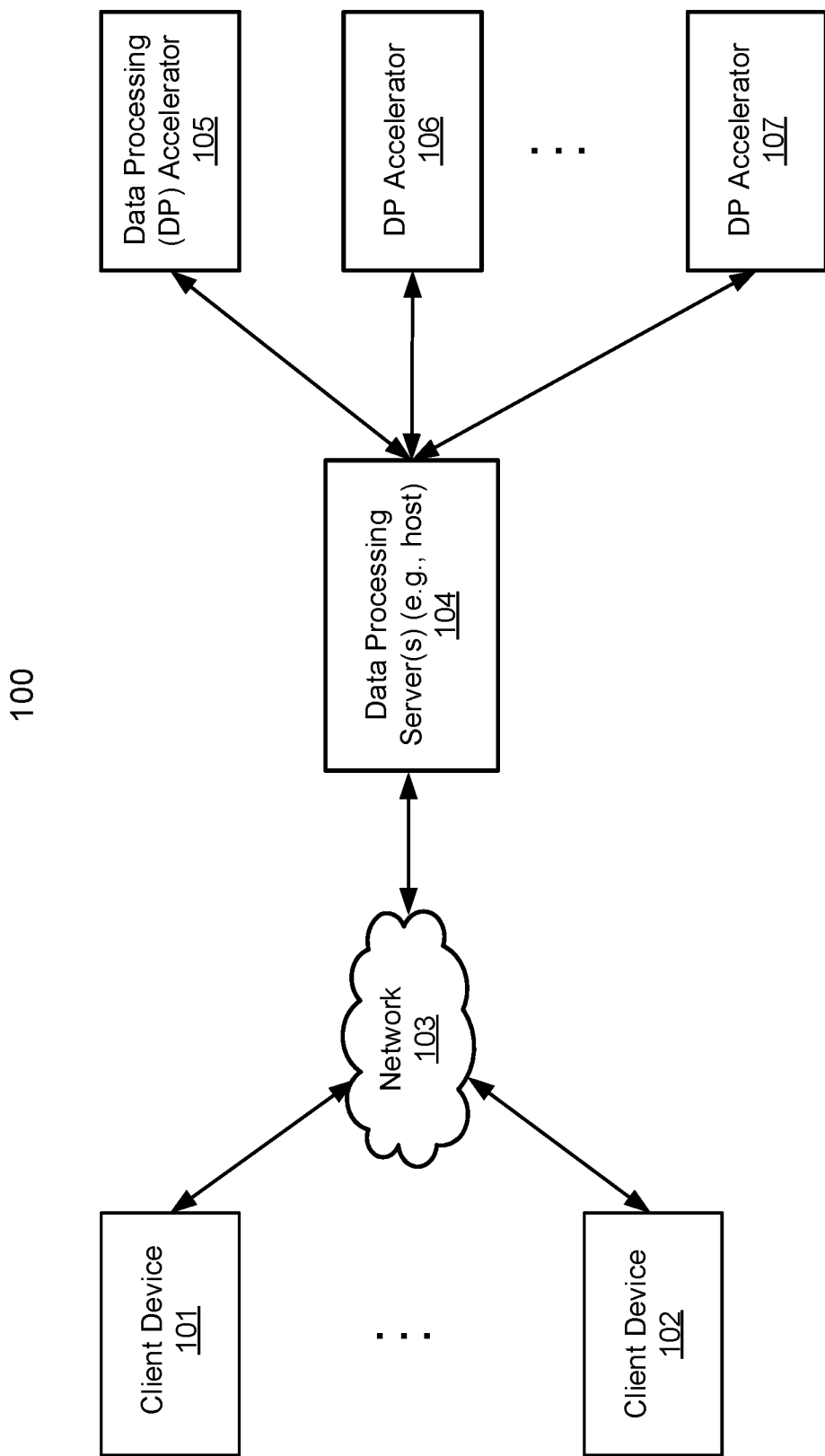

METHOD AND SYSTEM FOR ARTIFICIAL INTELLIGENCE MODEL TRAINING USING A WATERMARK-ENABLED KERNEL FOR A DATA PROCESSING ACCELERATOR

TECHNICAL FIELD

Embodiments of the present disclosure relate generally to artificial intelligence model training and inference. More particularly, embodiments of the disclosure relate to artificial intelligence model training and inference and the associated security performed by data processing accelerators.

BACKGROUND

Artificial intelligence (AI) models (also termed, "machine learning models") have been widely utilized recently as AI technology has been deployed in a variety of fields such as image classification or autonomous driving. Similar to an executable image or binary image of a software application, an AI model, when trained, can perform an inference based on a set of attributes to classify as features. As a result, an AI model can be "portable" and utilized without authorization. Currently there has been a lack of effective digital rights protection for AI models. In addition, a processing task using an AI model delegated to a secondary processing system, such as a processing (DP) accelerator or remote system, there has been lack of proof that the results produced by the DP accelerator system are protected by a "root of trust" system.

BRIEF DESCRIPTION OF THE DRAWINGS

Embodiments of the disclosure are illustrated by way of example and not limitation in the figures of the accompanying drawings in which like references indicate similar elements.

FIG. 1 is a block diagram illustrating a secure processing system, according to one embodiment.

DETAILED DESCRIPTION

Figure 2A:
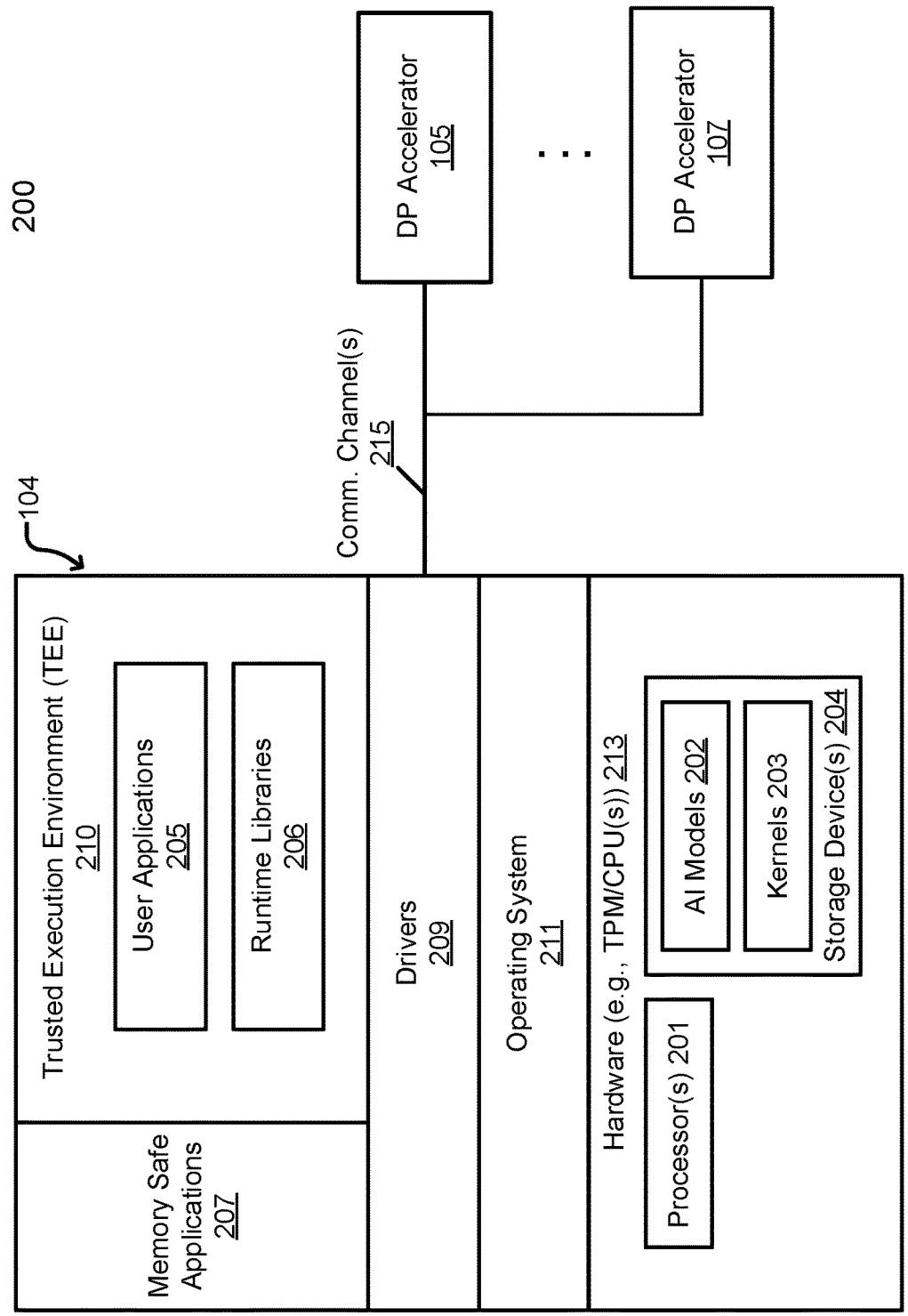
FIGS. 2A and 2B are a block diagrams illustrating a secure computing environment between one or more hosts and one or more data processing accelerators, according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The following embodiments relate to usage of a data processing (DP) accelerator to increase processing throughput of certain types of operations that may be offloaded (or delegated) from a host device to the DP accelerator. A DP accelerator can be a general-purpose processing unit (GPU), an artificial intelligence (AI) accelerator, math coprocessor, digital signal processor (DSP), or other type of processor. A DP accelerator can be a proprietary design, such as a Baidu® AI accelerator, or another GPU, and the like. While embodiments are illustrated and described with host device securely coupled to one or more DP accelerators, the concepts described herein can be implemented more generally as a distributed processing system.

The host device and the DP accelerator can be interconnected via a high-speed bus, such as a peripheral component interconnect express (PCIe), or other high-speed bus. The host device and DP accelerator can exchange keys and initiate a secure channel over the PCIe bus before performing operations of the aspects of the invention described below. Some of the operations include the DP accelerator using an artificial intelligence (AI) model to perform inferences using data provided by the host device. Before the AI model inferences are trusted by the host device, the host device can engage the DP accelerator to perform one or more validation tests, described below, including determining a watermark of the AI model. In some embodiments and operations, the DP accelerator is not aware that the host device is testing the validity of results produced by the DP accelerator.

A watermark of an AI model is an identifier or indicator embedded within the AI model, or in outputs of the AI model, or a combination thereof, that identifies or indicates the source/maker of the AI model. In some embodiments, the watermark can be a subset of coefficients or parameters such as weights within the AI model that, when extracted from the AI model, comprise the watermark. Some of the goals of the watermark include: identifying the AI model by its watermark; storing information, such as digital rights, within the AI model but without affecting inferences generated by the model, and associating inferences generated by an AI model to the AI model that generated the inferences, using the watermark as an identifier. The watermark should not be easily discoverable outside of a secure computing environment.

In an embodiment, the host device can send an input to the DP accelerator that, when the DP accelerator executes the AI model using the input, extracts the watermark from the AI model. The host device can validate the watermark before using the DP accelerator and/or AI model for trusted operations. A watermark-enabled AI model is an AI model that can extract its own watermark in response to specified input data.

In some embodiments, the host device can transmit a kernel to the DP processing device to use in performing one or more operations. In this context, a kernel is a small piece of code, provided to the DP accelerator, to be executed by the DP accelerator to perform the intended function of the kernel. In an embodiment, a kernel is provided to the DP accelerator by the host device as a part of performing proof-of-trust operations by the DP accelerator that will be validated by the host device. In some embodiments, the DP accelerator is not aware of the purpose of the kernel it executes on behalf of the host device.

In some embodiments, the kernel can be a "watermark-enabled kernel." A watermark-enabled kernel is a kernel that, when executed, is capable of extracting a watermark from an artificial intelligence (AI) model. An AI watermark is associated with a specific AI model and can be embedded or "implanted," within the AI model using several different methods. The watermark may be implanted into one or more weight variables of the one or more nodes of the AI model. In an embodiment, the watermark is stored in one or more bias variables of the one or more nodes of the AI modes, or by creating one or more additional nodes of the AI model during the training to store the watermark.

In some embodiments, the kernel can be a "watermark-inherited kernel." A watermark-inherited kernel is a kernel that can inherit a watermark from a data object, e.g. an existing AI model, or other data object. The kernel can then implant the inherited watermark into another AI model or an inference generated by an AI model.

In some embodiments, the kernel can be a "signature kernel," that can digitally sign any input that it receives. The signature kernel can generate a hash or digest of the input data to be signed and can embed that hash or digest into the input to be signed before signing the input. The hash or digest can be any hash algorithm, such as SHA-1, SHA-2, or SHA-3, et al. The input data with hash or digest can be encrypted (signed) using a private key of the data processing (DP) accelerator, a symmetric key shared with a host device, or a key received from the host device.

In some embodiments, a watermark-enabled AI model is an AI model having a watermark implanted within the AI model. In some embodiments, a host device may provide a watermark-enabled kernel to the DP accelerator so that the DP accelerator can, e.g., use an AI model to make an inference, then use the watermark-enabled kernel to extract the watermark from the AI model, embed the watermark in the inference, and digitally sign the inference. Such an embodiment allows the host device to verify that the DP accelerator did, indeed, use the correct AI model to perform the inference, indicating that the inference may be trusted.

With respect to any of the following aspects, in one embodiment, a watermark may be embedded in one or more nodes of one or more layers of an artificial intelligence (AI) model. For example, a watermark may be implanted in one or more weight variables or bias variables. Alternatively, one or more nodes (e.g., fake nodes that are not used or unlikely used by the artificial intelligence model) may be created to implant or store the watermark. A host processor may be a central processing unit (CPU) and a DP accelerator may be a general-purpose processing unit (GPU) coupled to the CPU over a bus or interconnect. A DP accelerator may be implemented in a form of an application-specific integrated circuit (ASIC), a field programmable gate array (FPGA) device, or other forms of integrated circuits (ICs). Alternatively, the host processor may be a part of a primary data processing system while a DP accelerator may be one of many distributed systems as secondary systems that the primary system can offload its data processing tasks remotely over a network (e.g., cloud computing systems such as a software as a service or SaaS system, or a platform as a service or PaaS system). A link between a host processor and a DP accelerator may be a peripheral component interconnect express (PCIe) link or a network connection such as Ethernet connection.

In a first aspect, a computer-implemented method performed by a data processing (DP) accelerator, the method includes receiving, at the DP accelerator, first data representing a set of training data from a host processor and performing training of an artificial intelligence (AI) model based on the set of training data within the DP accelerator. The method further includes implanting, by the DP accelerator, a watermark within the trained AI model and transmitting second data representing the trained AI model having the watermark implanted therein to the host processor. In an embodiment, the method further includes receiving a pre-trained machine learning model; and performing training for the pre-trained AI model based on the set of training data within the DP accelerator. The watermark may be implanted into one or more weight variables of the one or more nodes of the AI model. In an embodiment, the watermark is stored in one or more bias variables of the one or more nodes of the AI modes, or creating one or more additional nodes of the AI model during the training to store the watermark.

In a second aspect, a computer-implemented method performed by a data processing (DP) accelerator includes receiving, at the DP accelerator, first data representing an artificial intelligence (AI) model that has been previously trained from a host processor; receiving, at the DP accelerator, a request to implant a watermark in the AI model from the host processor; and implanting, by the DP accelerator, the watermark within the AI model. The DP accelerator then transmits second data representing the AI model having the watermark implanted therein to the host processor. In embodiment, the method further includes extracting, at the DP accelerator, a watermark algorithm identifier (ID) from the request to implant a watermark; and generating the watermark using a watermark algorithm identified by the watermark algorithm ID.

In a third aspect, a computer-implemented method performed by a data processing (DP) accelerator, includes receiving, at the DP accelerator, first data representing a set of training data from a host processor; receiving, at the DP accelerator, a watermark kernel from the host processor; and executing the watermark kernel within the DP accelerator on an artificial intelligence (AI) model. The watermark kernel, when executed, is configured to: generate a watermark, train the AI model using the set of training data, and implant the watermark within the AI model during training of the AI model. The DP accelerator then transmits second data representing the trained AI model having the watermark implanted therein to the host processor. In an embodiment, the method further includes receiving a pre-trained AI model and the training is performed for the pre-trained AI model. In an embodiment, the method further includes receiving a set of input data from the host processor. The watermark kernel is executed on the set of input data, and the watermark is generated based on the set of input data. In an embodiment, the set of input data includes information describing the watermark.

In a fourth aspect, a computer-implemented method performed by a data processing (DP) accelerator, includes receiving, at the DP accelerator, first data representing an artificial intelligence (AI) model that has been previously trained from a host processor and a set of input data; receiving, at the DP accelerator, a watermark kernel from the host processor; and executing the watermark kernel within the DP accelerator on the AI model. The watermark kernel, when executed, is configured to: perform inference operations of the artificial intelligence model based on the input data to generate output data, and implant the watermark within the output data. The DP accelerator then transmits the output data having the watermark implanted therein to the host processor. In an embodiment, the method further includes receiving a set of input data from the host processor. The watermark kernel is executed on the set of input data, and the watermark is generated based on the set of input data. The set of input data can include information describing the watermark.

In a fifth aspect, a computer-implemented method performed by a data processing (DP) accelerator, includes receiving, at the DP accelerator, first data representing a set of training data from a host processor; receiving, at the DP accelerator, a watermark kernel from the host processor; and executing the watermark kernel within the DP accelerator on an artificial intelligence (AI) model. The watermark kernel, when executed, is configured to: generate a new watermark by inheriting an existing watermark from a data object of the set of training data, train the AI model using the set of training data, and implant the new watermark within the AI model during training of the AI model. The DP accelerator then transmits second data representing the trained AI model having the new watermark implanted therein to the host processor.

In a sixth aspect, a computer-implemented method performed by a data processing (DP) accelerator, includes receiving, at the DP accelerator, an artificial intelligence (AI) model that has been previously trained and a set of input data from a host processor; receiving, at the DP accelerator, a watermark kernel from the host processor; executing the watermark kernel within the DP accelerator on the AI model and the set of input data. The watermark kernel, when executed, is configured to: generate a new watermark by inheriting an existing watermark from a data object of the set of input data or the AI model, perform an AI inference using the AI model based on the input data to generate output data, and implant the new watermark within the output data. The DP accelerator then transmits output data having the new watermark implanted therein to the host processor.

Any of the above functionality can be programmed as executable instructions onto one or more non-transitory computer-readable media. When the executable instructions are executed by a processing system having at least one hardware processor, the processing systems causes the functionality to be implemented. Any of the above functionality can be implemented by a processing system having at least one hardware processor, coupled to a memory programmed with executable instructions that, when executed, cause the processing system to implement the functionality.

FIG. 1 is a block diagram illustrating an example of system configuration for securing communication between a host 104 and data processing (DP) accelerators 105-107 according to some embodiments. Referring to FIG. 1, system configuration 100 includes, but is not limited to, one or more client devices 101-102 communicatively coupled to DP server 104 (e.g. host) over network 103. Client devices 101-102 may be any type of client devices such as a personal computer (e.g., desktops, laptops, and tablets), a "thin" client, a personal digital assistant (PDA), a Web enabled appliance, a Smart watch, or a mobile phone (e.g., Smartphone), etc. Alternatively, client devices 101-102 may be other servers. Network 103 may be any type of networks such as a local area network (LAN), a wide area network (WAN) such as the Internet, or a combination thereof, wired or wireless.

Server (e.g., host) 104 may be any kind of servers or a cluster of servers, such as Web or cloud servers, application servers, backend servers, or a combination thereof. Server 104 further includes an interface (not shown) to allow a client such as client devices 101-102 to access resources or services (such as resources and services provided by DP accelerators via server 104) provided by server 104. For example, server 104 may be a cloud server or a server of a data center that provides a variety of cloud services to clients, such as, for example, cloud storage, cloud computing services, artificial intelligence training services, data mining services, etc. Server 104 may be configured as a part of software-as-a-service (SaaS) or platform-as-a-service (PaaS) system over the cloud, which may be a private cloud, public cloud, or a hybrid cloud. The interface may include a Web interface, an application programming interface (API), and/or a command line interface (CLI).

For example, a client, in this example, a user application of client device 101 (e.g., Web browser, application), may send or transmit an instruction (e.g., AI training, inference instruction, etc.) for execution to server 104 and the instruction is received by server 104 via the interface over network 103. In response to the instruction, server 104 communicates with DP accelerators 105-107 to fulfill the execution of the instruction. In some embodiments, the instruction is a machine learning type of instruction where DP accelerators, as dedicated machines or processors, can execute the instruction many times faster than execution by server 104. Server 104 thus can control/manage an execution job for the one or more DP accelerators in a distributed fashion. Server 104 then returns an execution result to client devices 101-102. A DP accelerator or AI accelerator may include one or more dedicated processors such as a Baidu® artificial intelligence (AI) chipset available from Baidu, Inc.® or alternatively, the DP accelerator may be an AI chipset from another AI chipset provider.

According to one embodiment, each of the applications accessing any of DP accelerators 105-107 hosted by data processing server 104 (also referred to as a host) may verify that the application is provided by a trusted source or vendor. Each of the applications may be launched and executed within a trusted execution environment (TEE) specifically configured and executed by a central processing unit (CPU) of host 104. When an application is configured to access any one of the DP accelerators 105-107, an obscured connection can be established between host 104 and the corresponding one of the DP accelerator 105-107, such that the data exchanged between host 104 and DP accelerators 105-107 is protected against attacks from malware/intrusions.

FIG. 2A is a block diagram illustrating an example of a multi-layer protection solution for obscured communications between a host system 104 and data process (DP) accelerators 105-107 according to some embodiments. In one embodiment, system 200 provides a protection scheme for obscured communications between host 104 and DP accelerators 105-107 with or without hardware modifications to the DP accelerators. Referring to FIG. 2A, host machine or server 104 can be depicted as a system with one or more layers to be protected from intrusion such as user application(s) 205, runtime libraries 206, driver 209, operating system 211, and hardware 213 (e.g., security module (trusted platform module (TPM))/central processing unit (CPU)). Memory safe applications 207 can run in a sandboxed memory. Below the applications 205 and run-time libraries 206, one or more drivers 209 can be installed to interface to hardware 213 and/or to DP accelerators 105-107.

Hardware 213 can include one or more processor(s) 201 and storage device(s) 204. Storage device(s) 204 can include one or more artificial intelligence (AI) models 202, and one or more kernels 203. Kernels 203 can include signature kernels, watermark-enabled kernels, encryption and/or decryption kernels, and the like. A signature kernel, when executed, can digitally sign any input in accordance with the programming of the kernel. A watermark-enabled kernel can extract a watermark from a data object (e.g. an AI model or other data object). A watermark-enabled kernel can also implant a watermark into an AI model, an inference output, or other data object. A watermark kernel (e.g. a watermark inherited kernel) can inherit a watermark from another data object and implant that watermark into a different object, such as an inference output or an AI model. A watermark, as used herein, is an identifier associated with, and can be implanted into, an AI model or an inference generated by an AI model. For example, a watermark may be implanted in one or more weight variables or bias variables. Alternatively, one or more nodes (e.g., fake nodes that are not used or unlikely used by the artificial intelligence model) may be created to implant or store the watermark.

Host machine 104 is typically a CPU system which can control and manage execution of jobs on the host machine 104 and/or DP accelerators 105-107. In order to secure/obscure a communication channel 215 between DP accelerators 105-107 and host machine 104, different components may be required to protect different layers of the host system that are prone to data intrusions or attacks. For example, a trusted execution environment (TEE) can protect the user application 205 layer and the runtime library 206 layer from data intrusions.

System 200 includes host system 104 and DP accelerators 105-107 according to some embodiments. DP accelerators can include Baidu® AI chipsets or another AI chipset such as a graphical processing units (GPUs) that can perform artificial intelligence (AI)-intensive computing tasks. In one embodiment, host system 104 includes a hardware that has one or more CPU(s) 213 equipped with a security module (such as a trusted platform module (TPM)) within host machine 104. A TPM is a specialized chip on an endpoint device that stores cryptographic keys (e.g., RSA cryptographic keys) specific to the host system for hardware authentication. Each TPM chip can contain one or more RSA key pairs (e.g., public and private key pairs) called endorsement keys (EK) or endorsement credentials (EC), i.e., root keys. The key pairs are maintained inside the TPM chip and cannot be accessed by software. Critical sections of firmware and software can then be hashed by the EK or EC before they are executed to protect the system against unauthorized firmware and software modifications. The TPM chip on the host machine can thus be used as a root of trust for secure boot.

The TPM chip also secure driver(s) 209 and operating system (OS) 211 in a working kernel space to communicate with the DP accelerators 105-107. Here, driver 209 is provided by a DP accelerator vendor and can serve as a driver for the user application to control a communication channel(s) 215 between host and DP accelerators. Because the TPM chip and secure boot processor protects the OS 211 and drivers 209 in their kernel space, TPM also effectively protects the driver 209 and OS 211.

Since communication channels 215 for DP accelerators 105-107 may be exclusively occupied by the OS 211 and driver 209, thus, communication channels 215 can be secured through the TPM chip. In one embodiment, communication channels 215 include a peripheral component interconnect or peripheral component interconnect express (PCIE) channel. In one embodiment, communication channels 215 are obscured communication channels.

Host machine 104 can include trusted execution environment (TEE) 210 which is enforced to be secure by TPM/CPU 213. A TEE is a secure environment. TEE can guarantee code and data which are loaded inside the TEE to be protected with respect to confidentiality and integrity. Examples of a TEE may be Intel® software guard extensions (SGX), or AMD® secure encrypted virtualization (SEV). Intel® SGX and/or AMD® SEV can include a set of central processing unit (CPU) instruction codes that allows user-level code to allocate private regions of memory of a CPU that are protected from processes running at higher privilege levels. Here, TEE 210 can protect user applications 205 and runtime libraries 206, where user application 205 and runtime libraries 206 may be provided by end users and DP accelerator vendors, respectively. Here, runtime libraries 206 can convert application programming interface (API) calls to commands for execution, configuration, and/or control of the DP accelerators. In one embodiment, runtime libraries 206 provides a predetermined set of (e.g., predefined) kernels for execution by the user applications. In an embodiment, the kernels may be stored in storage device(s) 204 as kernels 203.

Host machine 104 can include memory safe applications 207 which are implemented using memory safe languages such as Rust, and GoLang, etc. These memory safe applications running on memory safe Linux® releases, such as MesaLock Linux®, can further protect system 200 from data confidentiality and integrity attacks. However, the operating systems may be any Linux® distributions, UNIX®, Windows® OS, or Mac® OS.

The host machine 104 can be set up as follows: A memory safe Linux® distribution is installed onto a system equipped with TPM secure boot. The installation can be performed offline during a manufacturing or preparation stage. The installation can also ensure that applications of a user space of the host system are programmed using memory safe programming languages. Ensuring other applications running on host system 104 to be memory safe applications can further mitigate potential confidentiality and integrity attacks on host system 104.

After installation, the system can then boot up through a TPM-based secure boot. The TPM secure boot ensures only a signed/certified operating system and accelerator driver are launched in a kernel space that provides the accelerator services. In one embodiment, the operating 211 system can be loaded through a hypervisor (not shown). A hypervisor or a virtual machine manager is a computer software, firmware, or hardware that creates and runs virtual machines. A kernel space is a declarative region or scope where kernels (i.e., a predetermined set of (e.g., predefined) functions for execution) are identified to provide functionalities and services to user applications. In the event that integrity of the system is compromised, TPM secure boot may fail to boot up and instead shuts down the system.

After secure boot, runtime libraries 206 runs and creates TEE 210, which places runtime libraries 206 in a trusted memory space associated with CPU 213. Next, user application 205 is launched in TEE 210. In one embodiment, user application 205 and runtime libraries 206 are statically linked and launched together. In another embodiment, runtime library 206 is launched in TEE 210 first and then user application 205 is dynamically loaded in TEE 210. In another embodiment, user application 205 is launched in TEE first, and then runtime 206 is dynamically loaded in TEE 210. Statically linked libraries are libraries linked to an application at compile time. Dynamic loading can be performed by a dynamic linker. Dynamic linker loads and links shared libraries for running user applications at runtime. Here, user applications 205 and runtime libraries 206 within TEE 210 are visible to each other at runtime, e.g., all process data are visible to each other. However, external access to the TEE is denied.

In one embodiment, the user application 205 can only call a kernel from a set of kernels as predetermined by runtime libraries 206. In another embodiment, user application 205 and runtime libraries 206 are hardened with side channel free algorithm to defend against side channel attacks such as cache-based side channel attacks. A side channel attack is any attack based on information gained from the implementation of a computer system, rather than weaknesses in the implemented algorithm itself (e.g. cryptanalysis and software bugs). Examples of side channel attacks include cache attacks which are attacks based on an attacker's ability to monitor a cache of a shared physical system in a virtualized environment or a cloud environment. Hardening can include masking of the cache, outputs generated by the algorithms to be placed on the cache. Next, when the user application finishes execution, the user application terminates its execution and exits from the TEE.

In one embodiment, TEE 210 and/or memory safe applications 207 is not necessary, e.g., user application 205 and/or runtime libraries 206 is hosted in an operating system environment of host 104.

In one embodiment, the set of kernels include obfuscation kernel algorithms. In one embodiment, the obfuscation kernel algorithms can be symmetric or asymmetric algorithms. A symmetric obfuscation algorithm can obfuscate and de-obfuscate data communications using a same algorithm. An asymmetric obfuscation algorithm requires a pair of algorithms, where a first of the pair is used to obfuscate and the second of the pair is used to de-obfuscate, or vice versa. In another embodiment, an asymmetric obfuscation algorithm includes a single obfuscation algorithm used to obfuscate a data set but the data set is not intended to be de-obfuscated, e.g., there is absent a counterpart de-obfuscation algorithm.

Obfuscation refers to obscuring of an intended meaning of a communication by making the communication message difficult to understand, usually with confusing and ambiguous language. Obscured data is harder and more complex to reverse engineering. An obfuscation algorithm can be applied before data is communicated to obscure (cipher/decipher) the data communication reducing a chance of eavesdrop. In one embodiment, the obfuscation algorithm can further include an encryption scheme to further encrypt the obfuscated data for an additional layer of protection. Unlike encryption, which may be computationally intensive, obfuscation algorithms may simplify the computations.

Some obfuscation techniques can include but are not limited to, letter obfuscation, name obfuscation, data obfuscation, control flow obfuscation, etc. Letter obfuscation is a process to replace one or more letters in a data with a specific alternate letter, rendering the data meaningless. Examples of letter obfuscation include a letter rotate function, where each letter is shifted along, or rotated, a predetermine number of places along the alphabet. Another example is to reorder or jumble up the letters based on a specific pattern. Name obfuscation is a process to replace specific targeted strings with meaningless strings. Control flow obfuscation can change the order of control flow in a program with additive code (insertion of dead code, inserting uncontrolled jump, inserting alternative structures) to hide a true control flow of an algorithm/AI model.

In summary, system 200 provides multiple layers of protection for DP accelerators (for data transmissions including machine learning models, training data, and inference outputs) from loss of data confidential and integrity. System 200 can include a TPM-based secure boot protection layer, a TEE protection layer, and a kernel validation/verification layer. Furthermore, system 200 can provide a memory safe user space by ensuring other applications on the host machine are implemented with memory safe programming languages, which can further eliminate attacks by eliminating potential memory corruptions/vulnerabilities. Moreover, system 200 can include applications that use side-channel free algorithms so to defend against side channel attacks, such as cache based side channel attacks.

Runtime 206 can provide obfuscation kernel algorithms to obfuscate data communication between a host 104 and DP accelerators 105-107. In one embodiment, the obfuscation can be pair with a cryptography scheme. In another embodiment, the obfuscation is the sole protection scheme and cryptography-based hardware is rendered unnecessary for the DP accelerators.

Figure 2B:
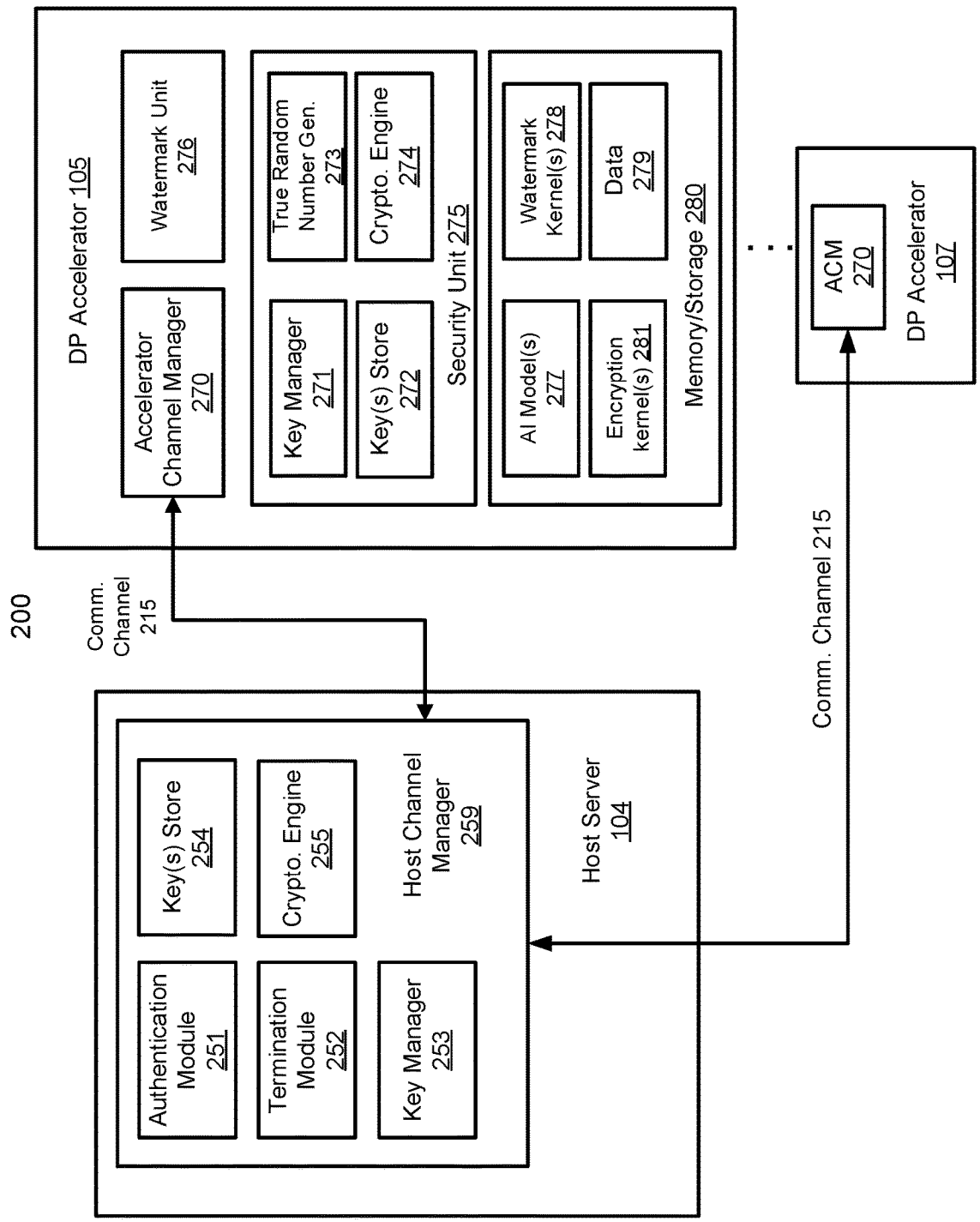

FIG. 2B is a block diagram illustrating an example of a host channel manager (HCM) 259 communicatively coupled to one or more accelerator channel managers (ACMs) 270 that interface to DP accelerators 105-107, according to some embodiments. Referring to FIG. 2B, in one embodiment, HCM 259 includes authentication module 251, termination module 252, key manager 253, key(s) store 254, and cryptography engine 255. Authentication module 251 can authenticate a user application running on host server 104 for permission to access or use a resource of a DP accelerator 105.

Termination module 252 can terminate a connection (e.g., channels associated with the connection would be terminated). Key manager 253 can manage (e.g., create or destroy) asymmetric key pairs or symmetric keys for encryption/decryption of one or more data packets for different secure data exchange channels. Here, each user application (as part of user applications 205 of FIG. 2A) can correspond or map to different secure data exchange channels, on a one-to-many relationship, and each data exchange channel can correspond to a DP accelerator 105. Each application can utilize a plurality of session keys, where each session key is for a secure channel corresponding to a DP accelerator (e.g., accelerators 105 . . . 107). Key(s) store 254 can store encryption asymmetric key pairs or symmetric keys. Cryptography engine 255 can encrypt or decrypt a data packet for the data exchanged through any of the secure channels. Note that some of these modules can be integrated into fewer modules.

In one embodiment, DP accelerator 105 includes ACM 270 and security unit (SU) 275. Security unit 275 can include key manager 271, key(s) store 272, true random number generator 273, and cryptography engine 274. Key manager 271 can manage (e.g., generate, safe keep, and/or destroy) asymmetric key pairs or symmetric keys. Key(s) store 272 can store the cryptography asymmetric key pairs or symmetric keys in secure storage within the security unit 275. True random number generator 273 can generate seeds for key generation and cryptographic engine 274 uses. Cryptography engine 274 can encrypt or decrypt key information or data packets for data exchanges. In some embodiments, ACM 270 and SU 275 is an integrated module.

DP accelerator 105 can further includes memory/storage 280 that can store artificial intelligence model(s) 277, watermark kernel(s) 278 (including inherited watermark kernels watermark-enabled kernels, watermark-signature kernels, et al.), encryption and decryption kernels 281, and data 279. HCM 259 can communicate with ACM 270 via communication channel 215.

In one embodiment, DP accelerator 105 further includes an AI unit, which may include an AI training unit and an AI inference unit. The AI training and inference units may be integrated into a single unit. The AI training module is configured to train an AI model using a set of training data. The AI model to be trained and the training data may be received from host system 104 via communication link 215. The AI model inference unit can be configured to execute a trained artificial intelligence model on a set of input data (e.g., set of input features) to infer and classify the input data. For example, an image may be input to an artificial intelligence model to classify whether the image contains a person, a landscape, etc. The trained artificial intelligence model and the input data may also be received from host system 104 via interface 140 over communication link 215.

In one embodiment, watermark unit 276 may include a watermark generator, and a watermark inscriber (also termed, "watermark implanter"). Watermark unit 276 may include a watermark kernel executor or kernel processor (not shown) to execute a kernel. In an embodiment, a kernel may be received from host 104, or retrieved from persistent or non-persistent storage, and executed in memory (not shown) of DP accelerator 105. The watermark generator is configured to generate a watermark using a predetermined watermark algorithm. Alternatively, the watermark generator can inherit a watermark from an existing watermark or extract a watermark from another data structure or data object, such as an artificial intelligence model or a set of input data, which may be received from host system 104. The watermark implanter is configured to inscribe or implant a watermark into a data structure such as an artificial intelligence model or output data generated by an artificial intelligence model. The artificial intelligence model or output data having a watermark implanted therein may be returned from DP accelerator 105 to host system 104 over communication link 215. Note that DP accelerators 105-107 have the identical or similar structures or components and the description concerning a DP accelerator would be applicable to all DP accelerators throughout this application.

Figure 3:
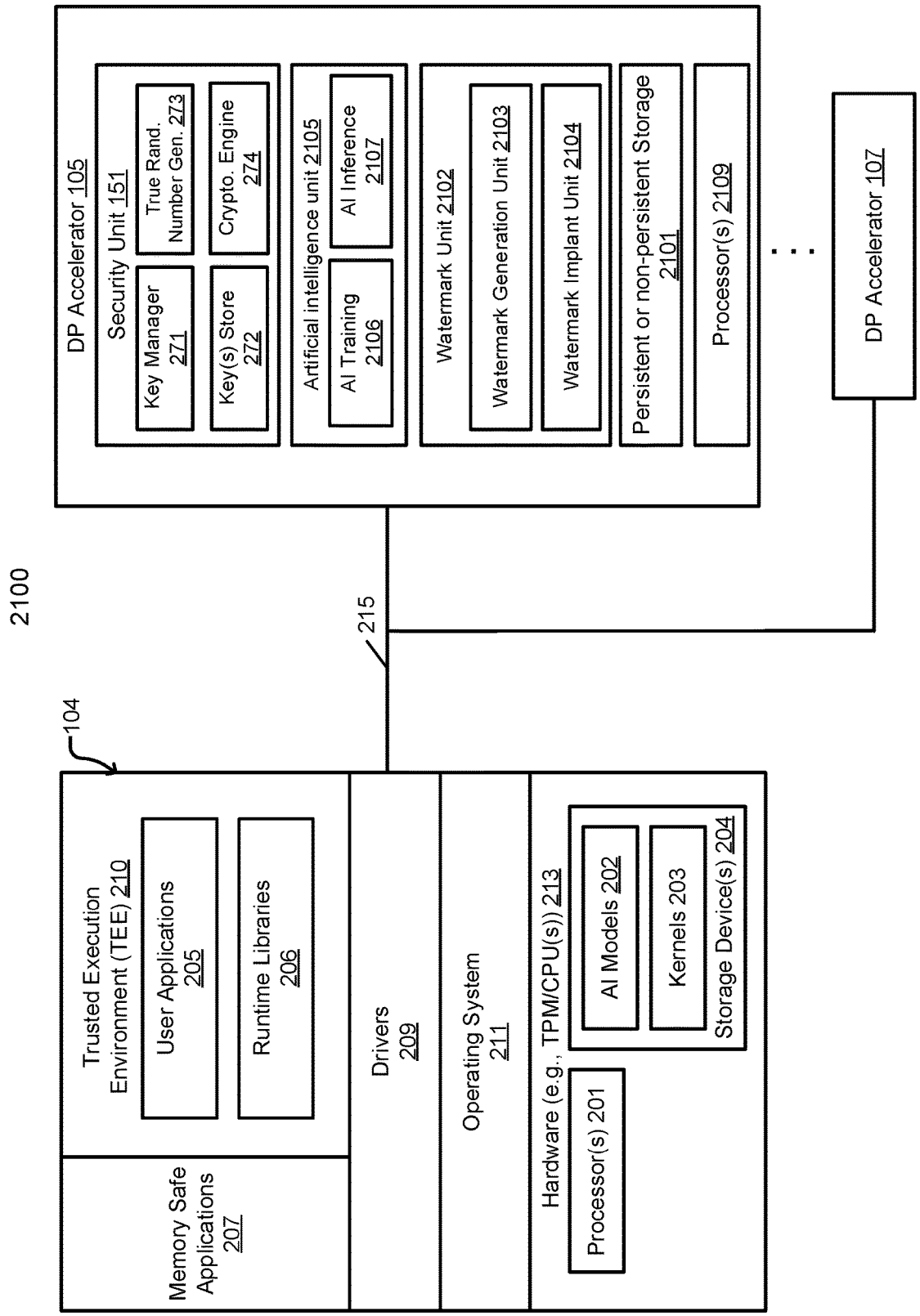
FIG. 3 is a block diagram illustrating a secure computing environment between one or more hosts and one or more data processing accelerators, according to one embodiment.

FIG. 3 is a block diagram illustrating an example of a data processing system according to one embodiment. System 2100 may be any data processing intense systems, such as, a data processing system of a data center, an SaaS platform, a PaaS platform, an autonomous driving system, etc. Referring to FIG. 3, system 2100 include a host system 104 coupled to one or more DP accelerators 105-107 (collectively referred to as DP accelerators 105) over a communication link 215. Although only two DP accelerators 105 and 107 shown, more or fewer number of DP accelerators may be applicable. Communication link 215 may be a bus (e.g., PCIe bus) or a network connection (e.g., Ethernet or Internet). Host system 104 is typically a CPU system configured to control and manage jobs run on host system 104 and DP accelerators 150, while DP accelerators perform the real data processing intensive computing jobs.

In one embodiment, host system 104 includes one or more processors 201, memory (not shown), and a persistent storage device 204. Processors 201 (also referred to as host processors) may be CPUs and memory may be any kind of random-access memory (RAM), while storage device 203 may be a hard drive, a solid state storage device (e.g., flash memory), etc. Memory includes loaded therein and executed by one or more processors 101, operating system (OS) 211 hosting one or more host applications 205, and runtime libraries 206. Host system 104 may be implemented as a trusted platform, for example, using TPM (trusted platform module) technology supported by the hardware (e.g., CPU). TPM is published by Trusted Computing Group (TCP).

Host application 205 may be a user application to perform a specific data intensive task, where application 205 is deployed in host system 104. In this example, host 104 may operate as a part of a software-as-a-service (SaaS) or platform-as-a-service (PaaS) platform. For example, application 205 may be an image processing application such as a face recognition application. The face recognition application may invoke an artificial intelligence model to classify an image, which may be offloaded or distributed to DP accelerators 105. Alternatively, host system 104 may be an artificial intelligence model training system, where the intensive training tasks are offloaded or distributed to DP accelerators 105.

Runtime libraries 206 may be associated with DP accelerators 105 and provided by a vendor of DP accelerators 105. Note that DP accelerator 105 through 107 may be provided by different vendors, in which different runtime libraries 206 and drivers 209 may be provided by different vendors respectively. Runtime library 206 is responsible for converting application calls from application 205 to a format compatible with drivers 209. Communication link 215 between host 104 and DP accelerator 105 may be a PCIe interface or Ethernet interface. Artificial intelligence (AI) models 202, stored in storage device(s) 204, may be the AI models to be trained or the previously trained AI models.

DP accelerator 105 can include a security unit 275, an artificial intelligence unit 2105, watermark unit 2102, persistent or non-persistent storage 2102, and one or more processors 2109. Persistent or non-persistent storage 2101 may include volatile or non-volatile memory which may hold one or more kernels (e.g. watermark-enabled kernels, encryption and/or decryption kernels, et al.), AI models, or data received from host 104.

Each DP accelerator 105 can include a trusted or security unit 275. Security unit 275 can include key manager 271, key(s) store 272, true random number generator 273, and cryptography engine 274. Key manager 271 can manage (e.g., generate, safe keep, and/or destroy) asymmetric key pairs or symmetric keys. Key(s) store 272 can store the cryptography asymmetric key pairs or symmetric keys in secure storage within the security unit 275. True random number generator 273 can generate seeds for key generation and cryptographic engine 274 uses. Cryptography engine 274 can encrypt or decrypt key information or data packets for data exchanges. In some embodiments, ACM 270 and SU 275 is an integrated module.

In one embodiment, artificial intelligence unit 2105 may include artificial intelligence training unit 2106 and artificial intelligence inference unit 2107, where these two units 2106-2107 may be integrated into a single unit. The artificial intelligence training module 2106 is configured to train an artificial intelligence model using a set of training data. The artificial intelligence model to be trained and the training data may be received from host system 104 via communication link 215. The artificial intelligence model inference unit 2107 can be configured to execute a trained artificial intelligence model on a set of input data (e.g., set of input features) to infer and classify the input data. For example, an image may be input to an artificial intelligence model to classify whether the image contains a person, a landscape, etc. The trained artificial intelligence model and the input data may also be received from host system 104 via interface 140 over communication link 215.

In one embodiment, watermark unit 2102 may include watermark generator 2103, and watermark inscriber (also termed, "watermark implanter") 2104. Watermark unit 2102 may include a watermark kernel executor or kernel processor (not shown) to execute a kernel. In an embodiment, a kernel may be received from host 104, or retrieved from persistent or non-persistent storage, and executed in memory (not shown) of DP accelerator 105. The watermark generator 2103 is configured to generate a watermark using a predetermined watermark algorithm. Alternatively, watermark generator 2103 can inherit a watermark from an existing watermark or extract a watermark from another data structure or data object, such as an artificial intelligence model or a set of input data, which may be received from host system 104. The watermark implanter 2104 is configured to inscribe or implant a watermark into a data structure such as an artificial intelligence model or output data generated by an artificial intelligence model. The artificial intelligence model or output data having a watermark implanted therein may be returned from DP accelerator 105 to host system 104 over communication link 215. Note that DP accelerators 105-107 have the identical or similar structures or components and the description concerning a DP accelerator would be applicable to all DP accelerators throughout this application.

According to one aspect, DP accelerator 105 can train an artificial intelligence model and implant a watermark within the artificial intelligence model during the training. In one embodiment, DP accelerator 105 is configured to receive first data representing an artificial intelligence model (also referred to as an AI model) to be trained and a set of training data from host processor 104 over communication link 215. The artificial intelligence model training unit 2106 performs training of the artificial intelligence model based on the set of training data. A request to implant a watermark in the artificial intelligence model is received by the DP accelerator 105 from the host processor 104. In response to the request, the watermark implanter or inscriber 2106 implants the watermark within the trained artificial intelligence model. Thereafter, DP accelerator 105 transmits second data representing the trained artificial intelligence model having the watermark implanted therein to the host processor 104 over the communication link 215. In one embodiment, the watermark generator 2103 extracts a watermark algorithm identifier (ID) from the request and generates the watermark using a watermark algorithm identified by the watermark algorithm ID.

Figure 4:
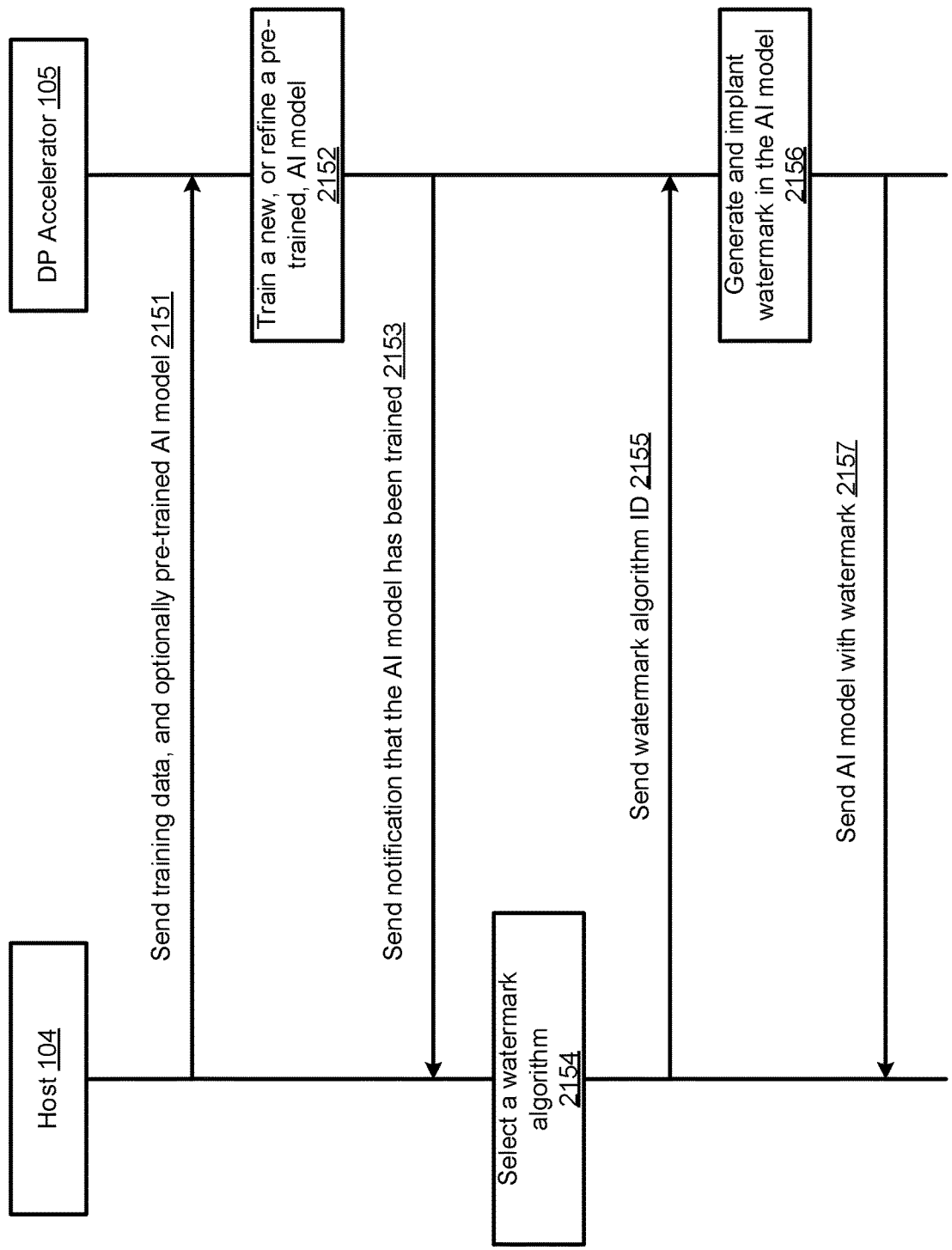
FIGS. 4-5 are flow diagrams illustrating a process of implanting a watermark in an AI model, according to one embodiment.
Figure 11:
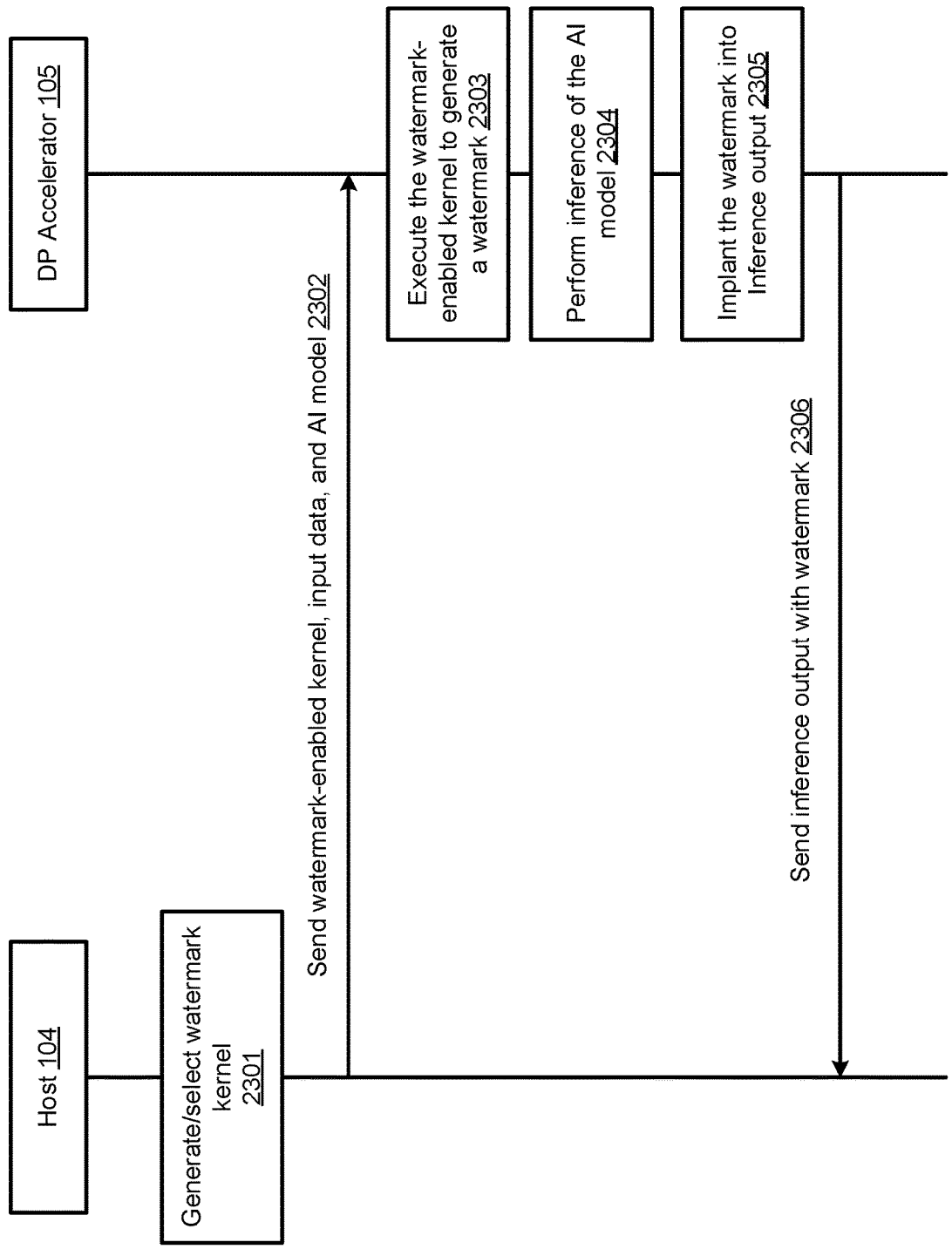
FIGS. 11-13 are flow diagrams illustrating a process of implanting a watermark of an AI model into an inference output from the AI model, according to one embodiment.
Figure 12:
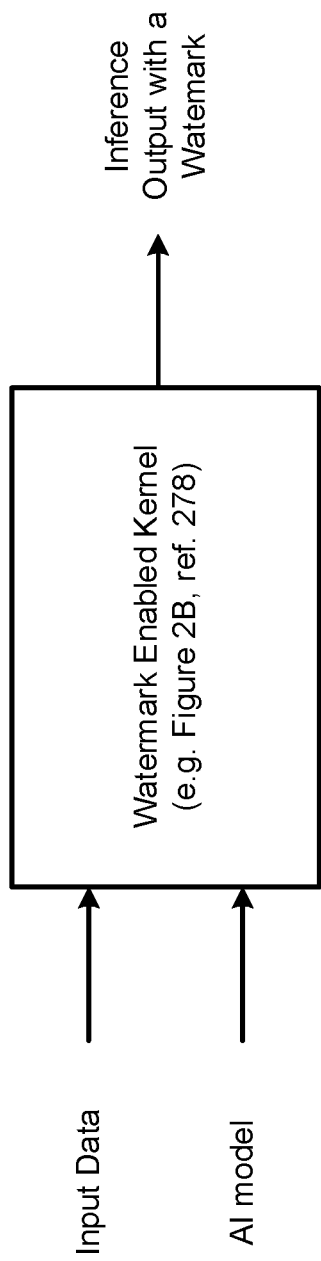

FIGS. 11 and 12 are flow diagrams illustrating a processing flow of implanting a watermark in an artificial intelligence (AI) model according to one embodiment. Referring to FIG. 4, via path 2151, host system 104 sends a set of training data and, optionally, a pre-trained AI model, to DP accelerator 105. In response, at block 2152, DP accelerator 105 performs artificial intelligence model training on a new AI model, or the pre-trained AI model, using the set of training data. Once the AI model has been trained, via path 2153, DP accelerator 105 sends a notification to host system 104 indicating that the artificial intelligence model has been trained. In response, at block 2154, host system 104 selects a watermark algorithm that is supported by DP accelerator watermark unit 2102 and sends a watermark algorithm ID to DP accelerator 105 via path 2155. Based on the watermark algorithm ID, at block 2156, DP accelerator watermark unit 2102 generates a watermark using a watermark algorithm identified by the watermark algorithm ID and implants the watermark into the AI model. In an embodiment, the watermark algorithm can be stored in persistent or non-persistent storage 2101 of DP accelerator 105, accessible by watermark unit 2102. DP accelerator 105 then transmits the trained AI model having the watermark implanted therein back to host system 104 via path 2157. Note that sending a notification from DP accelerator 105 to host system 104 may be optional. Host system 104 may send a request to implant a watermark to DP accelerator 105 without receiving a notification, where the request may include a watermark algorithm ID.

Figure 5:
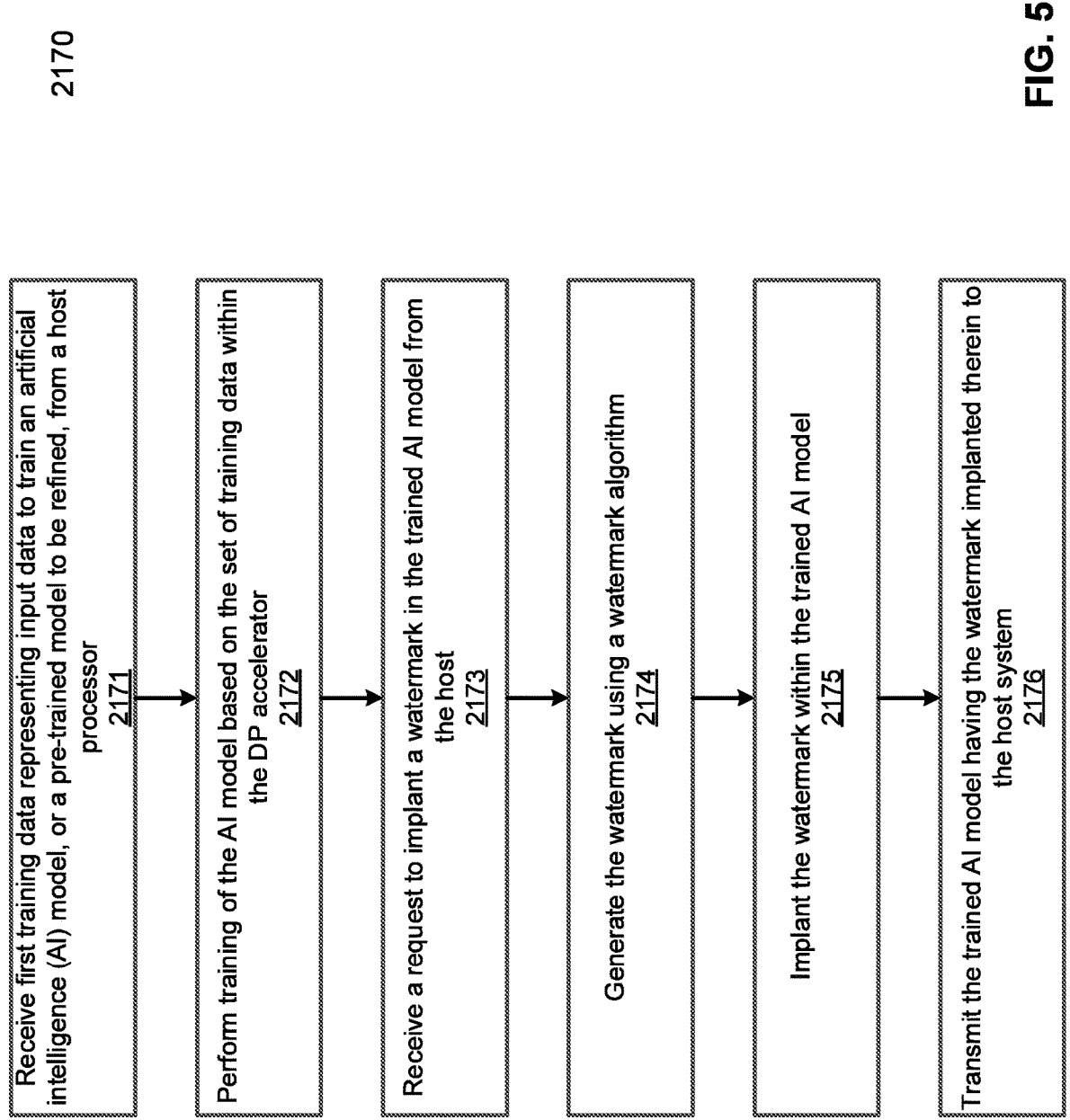

FIG. 5 is a flow diagram illustrating a process for implanting a watermark in an AI model, according to one embodiment. The process may be performed by processing logic which may include software, hardware, or a combination thereof. Process 2170 may be performed by DP accelerator 105. Referring to FIG. 5, at block 2171, a DP accelerator 105 receives first data representing a set of training data, and optionally, a pre-trained AI model, from a host processor 104 over a communication link 215. At block 2172, the DP accelerator 105 performs training of a new AI model, or the pre-trained AI model, if provided, using the set of training data. At block 2173, the DP accelerator receives a request to implant a watermark in the trained artificial intelligence model from the host processor. The request includes a watermark algorithm identifier (ID). At block 2174, the DP accelerator watermark unit 2102 generates a watermark using a watermark algorithm identified in the request. At block 2175, the DP accelerator implants the watermark within the trained AI model. At block 2176, the DP accelerator transmits second data representing the trained AI model, having the watermark implanted therein, to the host processor 104 over the communication link 215.

According to another aspect, DP accelerator 105 can also implant a watermark into an existing or previously trained artificial intelligence model. Referring back to FIG. 3, in one embodiment, DP accelerator 105 receives first data representing an artificial intelligence model that has been previously trained (e.g., an existing legacy artificial intelligence model) from host processor 104 over a communication link 215. The DP accelerator 105 further receives a request to implant a watermark in the AI model from the host processor 104 over the communication link 215. In response to the request, the watermark generator 2103 extracts a watermark algorithm ID from the request and generates a watermark using a watermark algorithm identified by the watermark algorithm ID. The watermark implanter 2104 then implants the watermark in the artificial intelligence model received from the host processor 101. Thereafter, the DP accelerator 105 transmits second data representing the AI model having the watermark implanted therein to the host processor 104 over the communication link 215. In this embodiment, DP accelerator 105 is configured to implant a watermark into an existing artificial intelligence model that has been trained.

Figure 6:
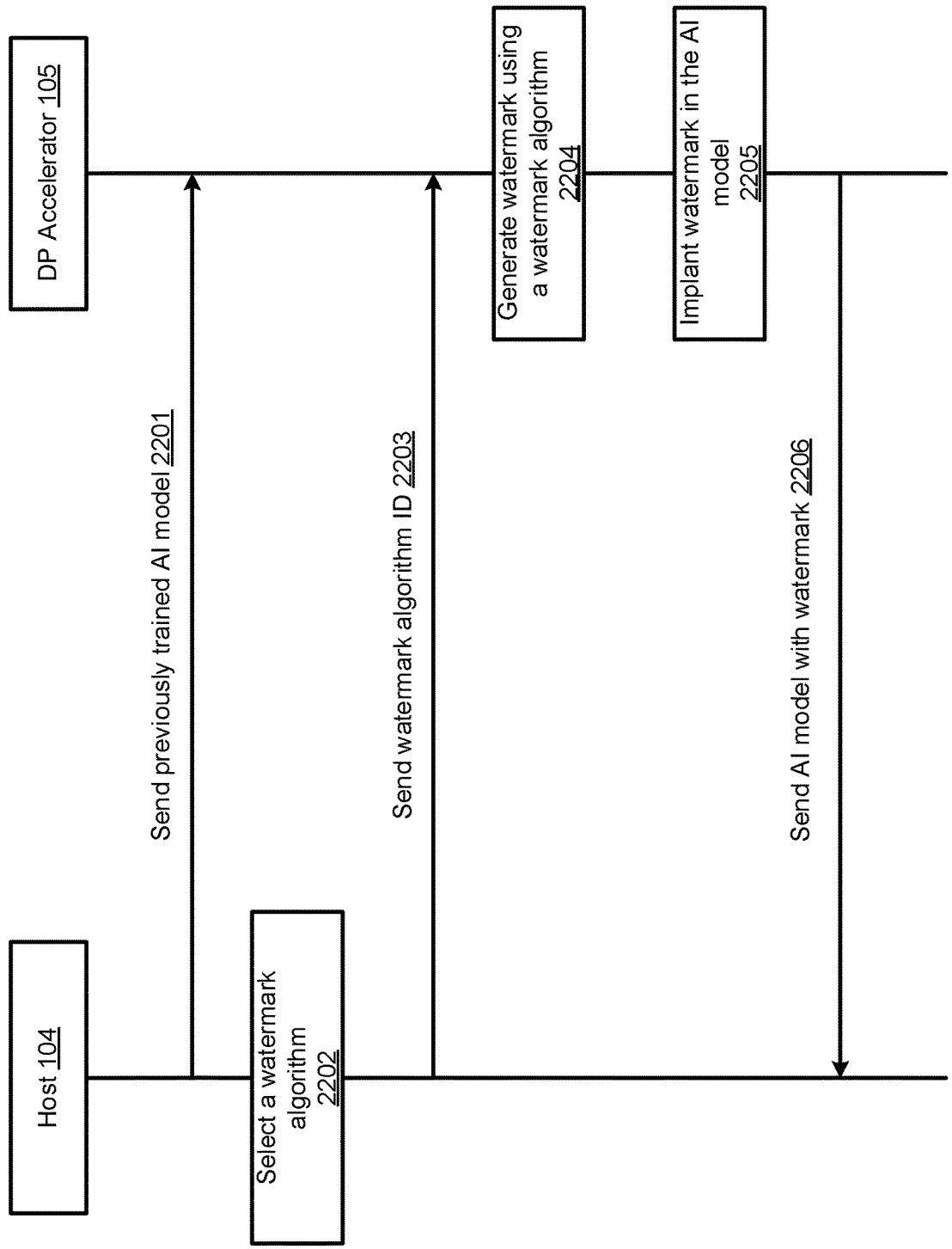
FIGS. 6-7 are flow diagrams illustrating a process of implanting a watermark in a trained AI model according to one embodiment.

FIG. 6 is a processing flow diagram illustrating a processing of implanting a watermark in a trained artificial intelligence (AI) model, according to one embodiment. Referring to FIG. 6, host system 104 transmits an AI model previously trained to DP accelerator 105 via path 2201. That is, the AI model is an existing model that has been trained and generated. At block 2202, host system 104 selects a watermark algorithm that is supported by DP accelerator watermark unit 2102 and sends a watermark algorithm ID identifying the selected watermark algorithm to DP accelerator 105 via path 2203. In response, at block 2204, DP accelerator watermark generation unit 2103 generates a watermark using a watermark algorithm identified by the watermark algorithm ID. At block 2205, DP accelerator implants the watermark in the previously trained AI model. The artificial intelligence model having the watermark implanted therein is then returned back to host system via path 2206.

Figure 7:
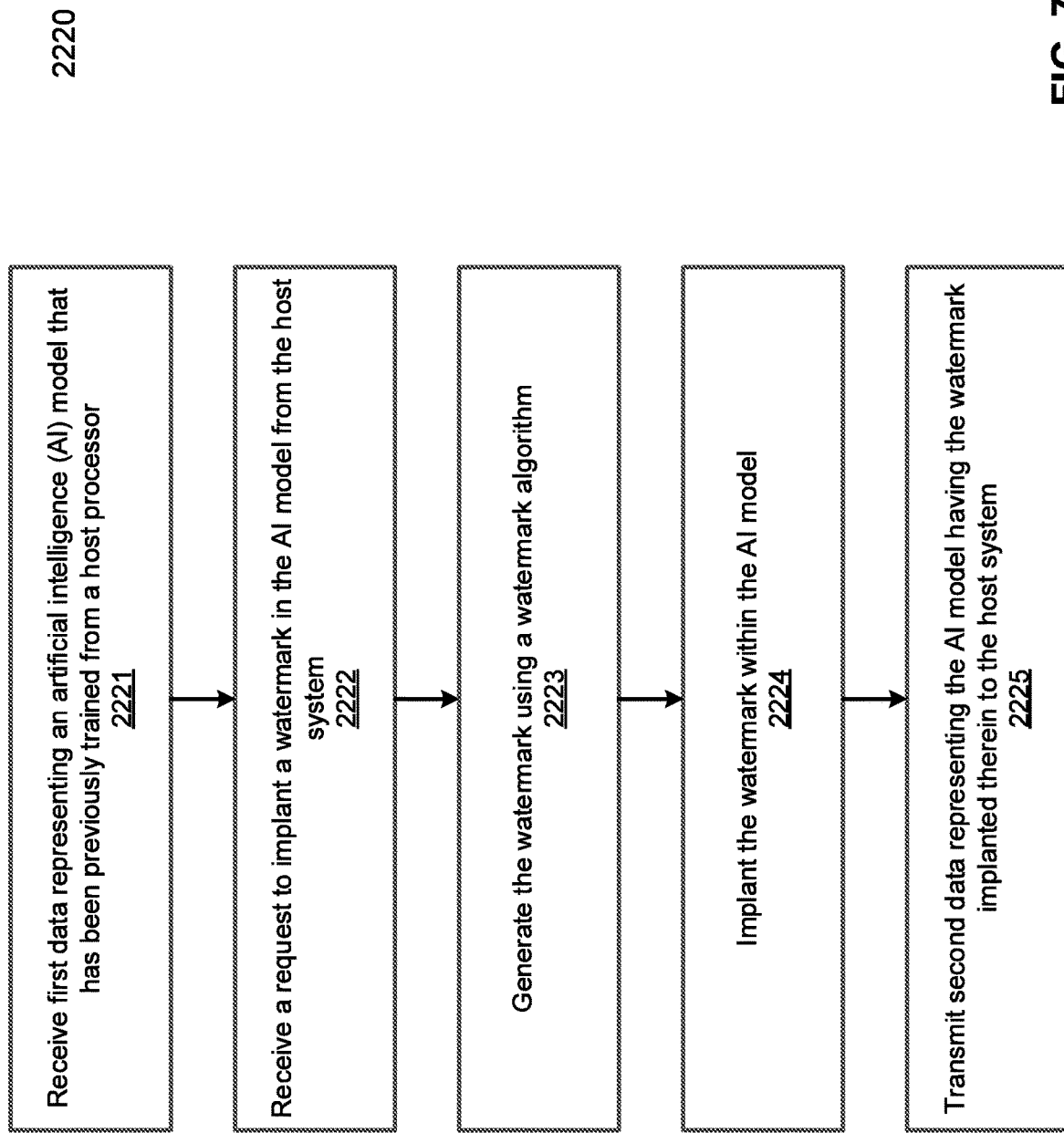

FIG. 7 is a flow diagram illustrating a process of implanting a watermark in a trained artificial intelligence (AI) model according to one embodiment. The process may be performed by processing logic which may include software, hardware, or a combination thereof. Process 2220 may be performed by DP accelerator 105. Referring to FIG. 7 at block 2221, a DP accelerator 105 receives first data representing an AI model that has been previously trained from a host processor 104 over a communication link 215. At block 2222, the DP accelerator 105 receives a request to implant a watermark in the AI model from the host processor 104 over the communication link 215. At block 2223, the DP accelerator watermark generation unit 2103 generates a watermark using a watermark algorithm. At block 2224, the DP accelerator watermark implant unit 2104 implants the watermark within the AI model. At block 2225, the AI model having the watermark implanted therein is returned back to the host processor.

According to another aspect, a watermark may be implanted by executing a watermark kernel within a DP accelerator 105. The watermark kernel may be provided by the host system. The term, "kernel," refers to a piece of executable code that can be independently executed by an accelerator or an execution environment. Referring back to FIG. 3, in one embodiment, DP accelerator 105 receives first data representing an artificial intelligence model to be trained and a set of training data from a host processor 104 over communication link 215. The DP accelerator 105 further receives a watermark kernel (e.g., watermark-enabled kernel) from the host processor 104 over communication link 215. DP accelerator 105 executes the watermark kernel on the AI model. The watermark kernel, when being executed, will generate a watermark, perform or invoke train the AI model, and implant or invoke watermark implanter 2104 to implant the watermark into the AI as a part of the training processing. Thereafter, the DP accelerator 105 transmits the trained AI model having the watermark implanted therein to the host 104 over the communication link 215. In one embodiment, the watermark kernel is executed on a set of input data, where the input data includes information describing the watermark.

Figure 8:
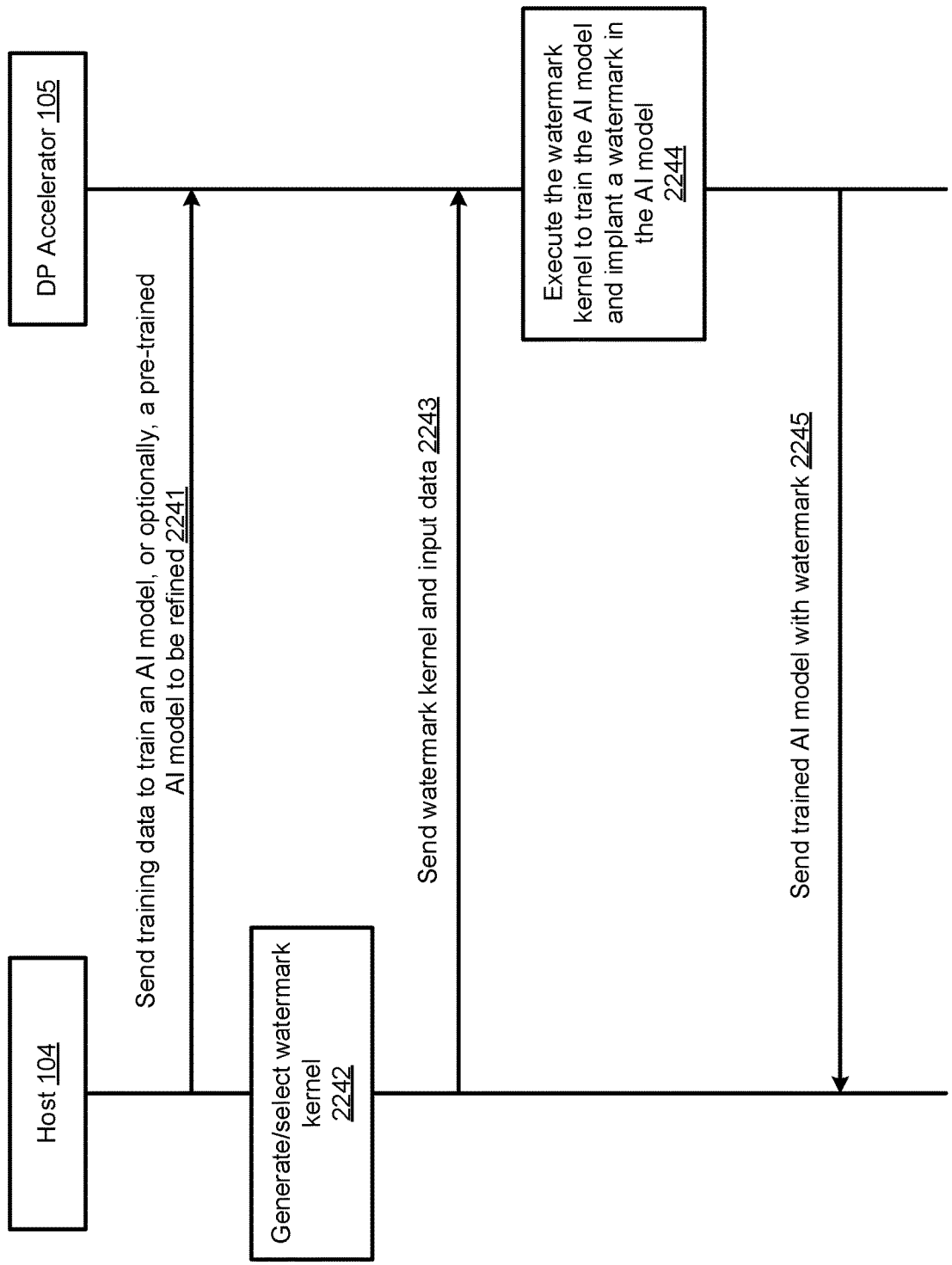
FIGS. 8-10 are flow diagram illustrating a process of training an AI model and implanting a watermark in the AI model using a watermark-enabled kernel, according to one embodiment.

FIG. 8 is a processing flow diagram illustrating a process of training an artificial intelligence (AI) model and implanting a watermark in the AI model, according to one embodiment. Referring to FIG. 8, host 104 sends a set of training data, or optionally, a pre-trained AI model, to DP accelerator 105 via path 2241. At block 2242, host system 104 generates a watermark kernel, or selects a watermark kernel, and sends the watermark kernel and a set of input data to DP accelerator 105 via path 2243. At block 2244, DP accelerator 105 executes the watermark kernel to train an AI model (which can be refining the optionally received pre-trained model) using the set of training data, and implants a watermark into the AI model during the training using the input data. The input data may contain information describing the watermark or watermark algorithm. Thereafter, the trained AI model having the watermark implanted therein is returned back to the host system 104 via path 2245.

Figure 9:
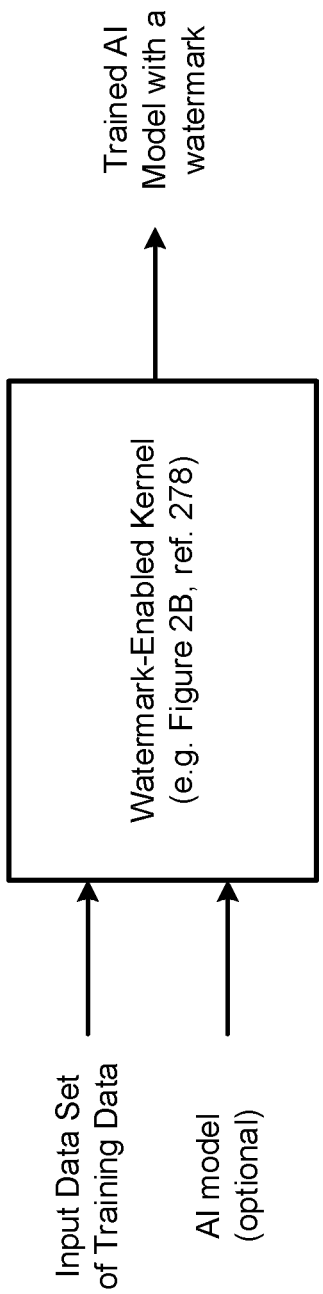

FIG. 9 is a flow diagram illustrating a process of training an AI model and using a watermark-enabled kernel to implant a watermark in an AI model according to one embodiment. A watermark-enabled kernel, e.g. as shown in FIG. 2B, reference 278, above, receives a first set of input training data, and optionally, a pre-trained AI model. If the watermark-enabled kernel receives the pre-trained AI model, then the first set of input training data will be used to refine the pre-trained model. If the watermark-enabled kernel does not receive the pre-trained AI model, then the watermark-enabled kernel will generate a new AI model using the first set of training data. The process may be performed by processing logic which may include software, hardware, or a combination thereof.

Figure 10:
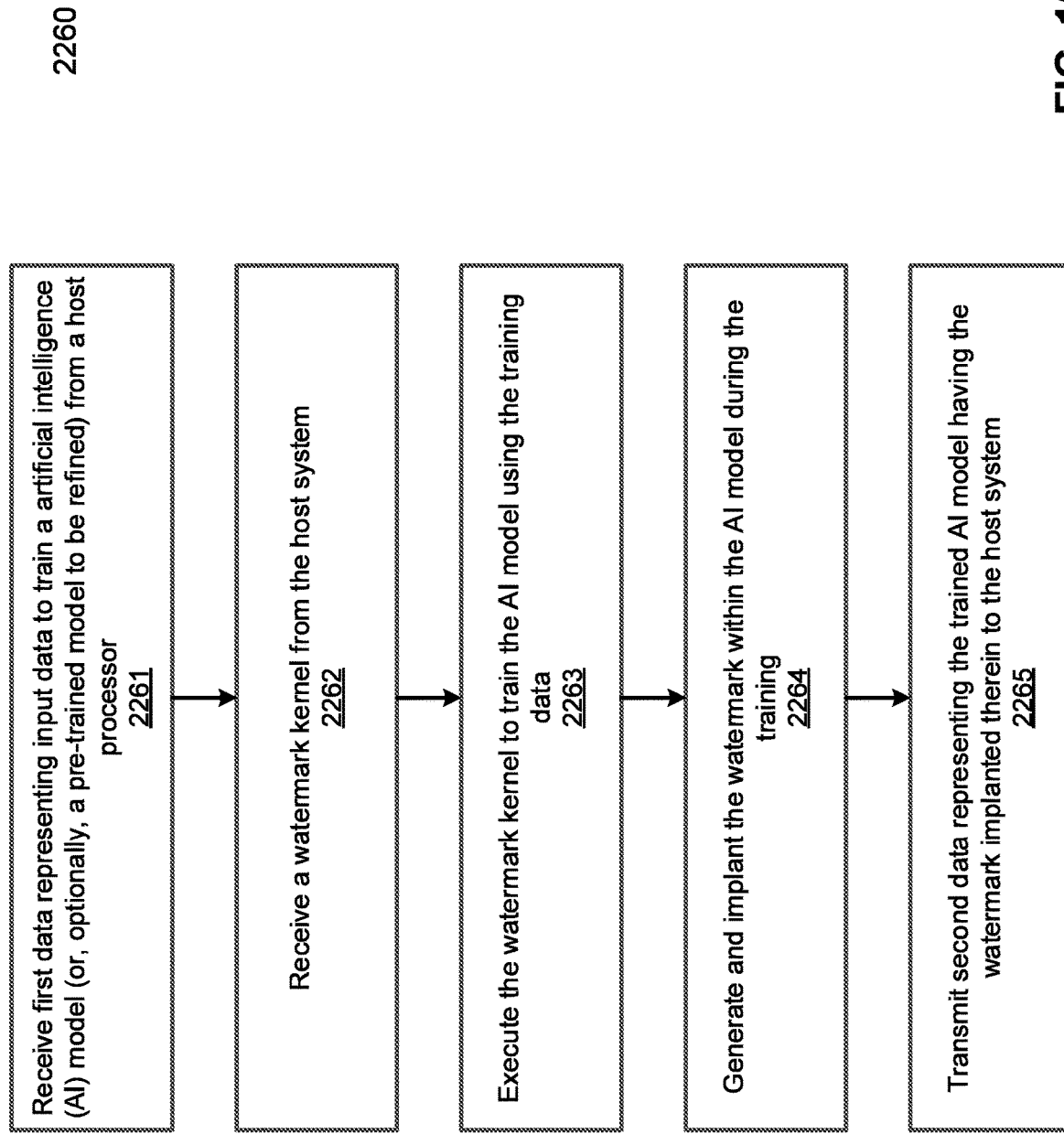

Referring now to FIG. 10, process 2260 may be performed by DP accelerator 105. At block 2261, a DP accelerator receives first data representing a set of training data, and optionally, a pre-trained AI model, from a host processor over a link. At block 2262, the DP accelerator 105 further receives a watermark kernel from the host processor over the link. At block 2263, the watermark kernel is executed to either refine the training of the pre-trained model or to generate a new model using the set of training data. During the training, at block 2264, the watermark-enabled kernel generates a watermark and implants within the AI model. At block 2265, second data representing the trained AI model having the watermark implanted therein is returned to the host processor 104 over the communication link 215.

According to another aspect, a watermark kernel can also be utilized to implant a watermark into an existing AI model that has been trained previously. Referring back to FIG. 8, in one embodiment, DP accelerator 105 receives first data representing a set of training data, and optionally a pre-trained AI model, from a host 104 over communication link 215. The DP accelerator 105 further receives a watermark kernel (e.g., watermark enabled kernel) from the host 104 over the communication link 215. The DP accelerator 105 executes the watermark kernel on the AI model. The watermark kernel, when being executed, will generate a watermark, perform training of the AI model, and implant or invoke watermark implanter 2104 to implant the watermark into the artificial intelligence model as a part of the training processing. Thereafter, the DP accelerator 105 transmits the trained AI model having the watermark implanted therein to the host 104 over the link. In one embodiment, the watermark kernel is executed on a set of input data, where the input data includes information describing the watermark.

FIG. 11 is a flow processing diagram illustrating a processing flow of implanting a watermark in an inference generated using an artificial intelligence (AI) model according to one embodiment. Referring to FIG. 11, at block 2301, host 104 compiles and generates a watermark kernel and sends the watermark kernel to DP accelerator 105 via path 2302. Host 104 further sends an AI model that has been previously trained to DP accelerator 105 via path 2302, requesting DP accelerator 105 to implant a watermark. At block 2303, DP accelerator executes the watermark-enabled kernel on the AI model to generate the watermark. At block 2304, DP accelerator 105 executes kernel on the AI model using the input data to perform an inference, and to implant a watermark into the output data of the inference, for example, as shown in FIG. 12. In one embodiment, the input data may include information describing the watermark. The output data having the watermark implanted therein is then transmitted from DP accelerator 105 to host 104 via path 2305. Thus, in this embodiment, the output data of the inference operation using an AI model would include a watermark indicating AI model that generated the inference.

FIG. 12 is a flow diagram illustrating a process of implanting a watermark in an inference output from an artificial intelligence (AI) model, according to one embodiment. The process may be performed by processing logic which may include software, hardware, or a combination thereof. Input data and an AI model are input to a watermark-enabled kernel. The watermark-enabled kernel extracts the watermark from the AI model, in part based on the input data, and the AI model generates an inference based on the input data. The watermark-enabled kernel then implants the watermark into the inference and outputs the inference, with implanted watermark.

Figure 13:
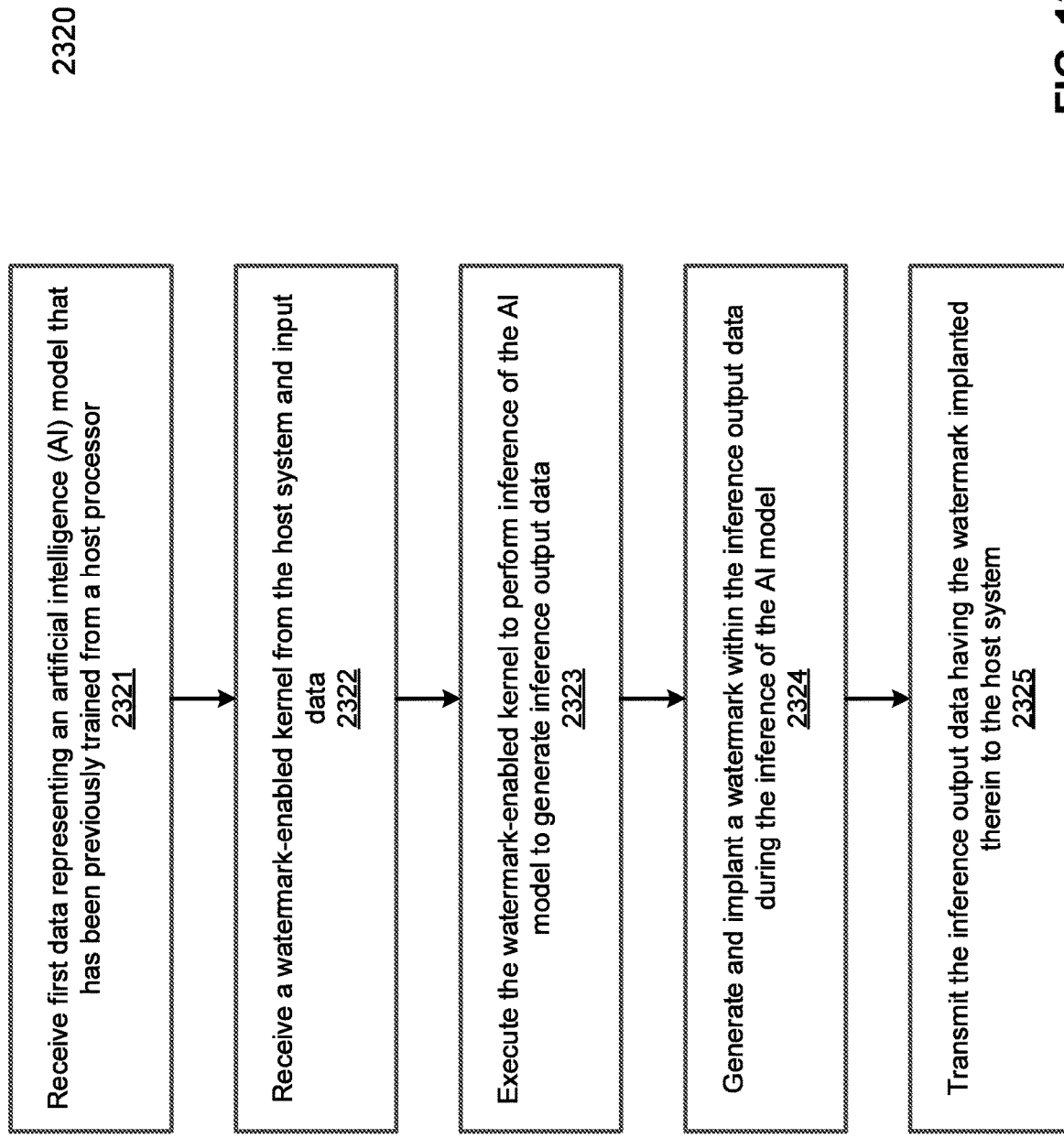

Referring now to FIG. 13, a process for implanting a watermark in an inference output of an AI model includes, at block 2321, a DP accelerator receiving first data representing an artificial intelligence (AI) model that has been trained previously from a host processor 104 over a communication link 215. At block 2322, the DP accelerator further receives a watermark-enabled kernel and second data from the host processor 104 over the communication link 215. At block 2323, the DP accelerator executes the watermark-enabled kernel to perform inference operations of the AI model to generate output data and to implant the watermark within the output data at block 2324. At block 2325, the output data having the watermark implanted therein is returned to the host system 104 over the communication link 215.

According to another aspect, a watermark-enabled kernel may also be utilized to inherit a watermark from another data structure or data object, such as a set of input data or an artificial intelligence model, and to implant the inherited watermark in another artificial intelligence model. In this situation, a data object already includes a watermark implanted therein. A watermark kernel, when executed, can extract or inherit the watermark from the data object and use that watermark to implant into another artificial intelligence model.

Figure 14:
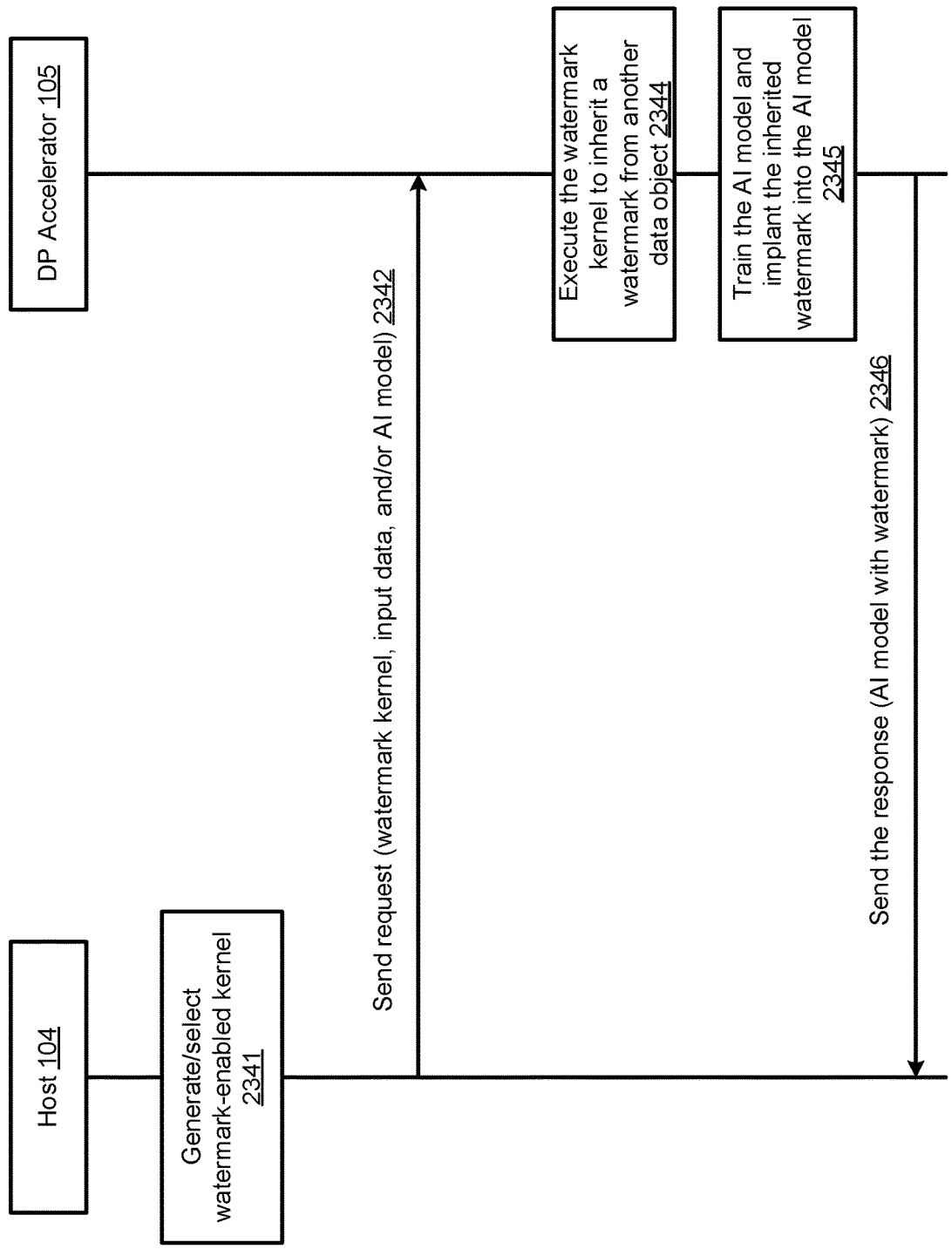
FIGS. 14-16 are flow diagrams illustrating a process of inheriting a watermark from a data object, training an AI model, and implanting the inherited watermark into the AI model, according to another embodiment.

FIG. 14 is a processing flow diagram illustrating a process of inheriting a watermark from a data object, training an artificial intelligence (AI) model, and implanting the inherited watermark into the AI model, according to another embodiment. Referring to FIG. 14, at block 2341, host system 104 generates a watermark kernel (e.g. watermark-inherited kernel) that is capable of extracting or inheriting a watermark from a data object or data structure other than the AI model. Host system 104 sends the watermark kernel, a set of training data, and optionally an AI model, to DP accelerator 105 via path 2342. In response, at block 2344, the watermark kernel is executed within DP accelerator 105 to extract or inherit an existing watermark from a data object other than the AI model, and at block 2345, the AI model is trained. In an embodiment wherein the DP accelerator receives a pre-trained AI model, the AI model is further trained, or refined, during the training process. In an embodiment wherein the DP accelerator does not receive a pre-trained AI model, the AI model is generated during the training. During the training, the inherited watermark is implanted within the AI model. The trained AI model having the watermark implanted therein is returned to host system 104 via path 2346.

Figure 15:
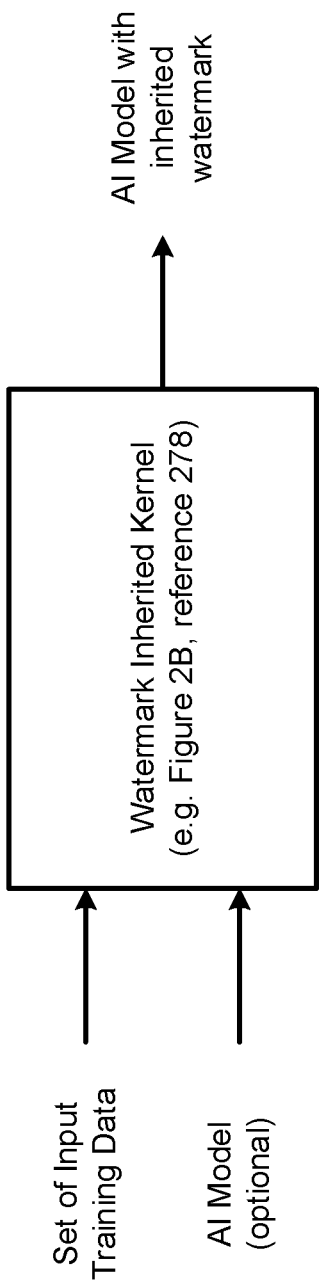

FIG. 15 is a flow diagram illustrating a process of inheriting a watermark from a data object, training an artificial intelligence (AI) model, and implanting the inherited watermark in the AI model according to another embodiment. The process may be performed by processing logic which may include software, hardware, or a combination thereof. The process may be performed by DP accelerator 105. The watermark kernel (e.g. watermark-inherited kernel) receives a set of input representing training data and, optionally, an AI model. The watermark kernel can inherit a watermark from another data object. If the watermark kernel receives the AI model, then the watermark kernel can train, or further refine, the AI model and implant the watermark in the refined AI model. If the watermark kernel does not receive the AI model, the watermark kernel can generate and train a new AI model and implant the watermark in the new AI model, resulting in a trained AI model with an inherited watermark.

Referring back to FIG. 3, according to one embodiment, DP accelerator 105 receives first data representing a set of training data, and optionally, an artificial intelligence (AI) model to be trained, from host 104 over communication link 215. The DP accelerator 105 further receives a watermark kernel (e.g., watermark-inherited kernel) from the host 104. The watermark kernel is executed by the DP accelerator 105 on the AI model. The watermark kernel, when executed within DP accelerator 105, generates a new watermark by inheriting an existing watermark, trains the AI model, and implants the new watermark into the AI model during the training. The trained AI model having the watermark implanted therein is then transmitted back to the host 104. The existing watermark may be received from the host processor, so that the watermark kernel can inherit the existing watermark.

Figure 16:
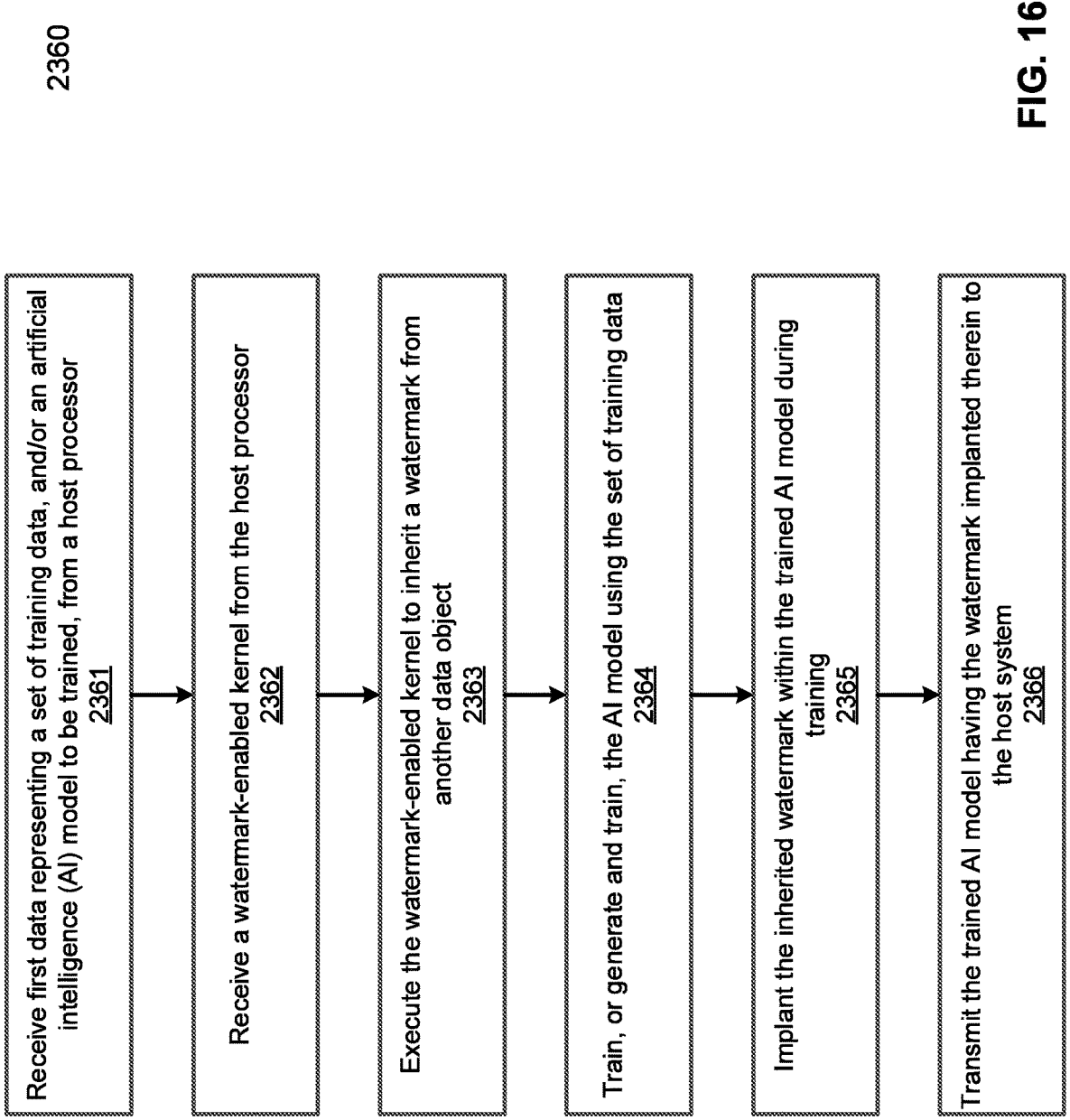

Referring to FIG. 16, at block 2361, a DP accelerator 105 receives first data representing a set of training data, and optionally a pre-trained AI model, from a host system 104 over a communication link 215. At block 2362, the DP accelerator further receives a watermark-enabled kernel from the host system 104 over the communication link 215. At block 2363, the DP accelerator generates a new watermark by inheriting an existing watermark, either from a set of input data or from another data object such as another AI model. At block 2364, the DP accelerator performs training of the pre-trained model, or generates and trains a new AI model, using the training data. At block 2365, the inherited watermark is implanted within the AI model during the training. At block 2366, the trained AI model having the inherited watermark is transmitted from the DP accelerator to the host system 104 over the communication link 215.

According to another aspect, a watermark can also be inherited by a watermark kernel (e.g. watermark-inherited kernel) during the inference of an existing AI model and be implanted in the output data of the inference of the AI model. As a result, there is no need to modify the AI model or a DP accelerator in order to generate an output having the digital rights of the AI model implanted therein, for example, to prove that the AI model utilized to generate the inference output is from an authorized entity.

Referring back to FIG. 3, according to one embodiment, DP accelerator 105 receives first data representing a set of input data, and/or an artificial intelligence (AI) model that has been previously trained or generated, from host 104 over communication link 215. The DP accelerator 105 further receives a watermark kernel (e.g., watermark-inherited kernel) from the host 104. The watermark kernel is executed within the DP accelerator 105 on the AI model and the input data. The watermark kernel, when executed, generates a new watermark based on an existing watermark inherited from one of the input data or the AI model, performs artificial intelligence inference using the AI model to generate output data, and implants the new watermark within the output data. The output data having the watermark implanted therein is then returned back to the host 104.

Figure 17:
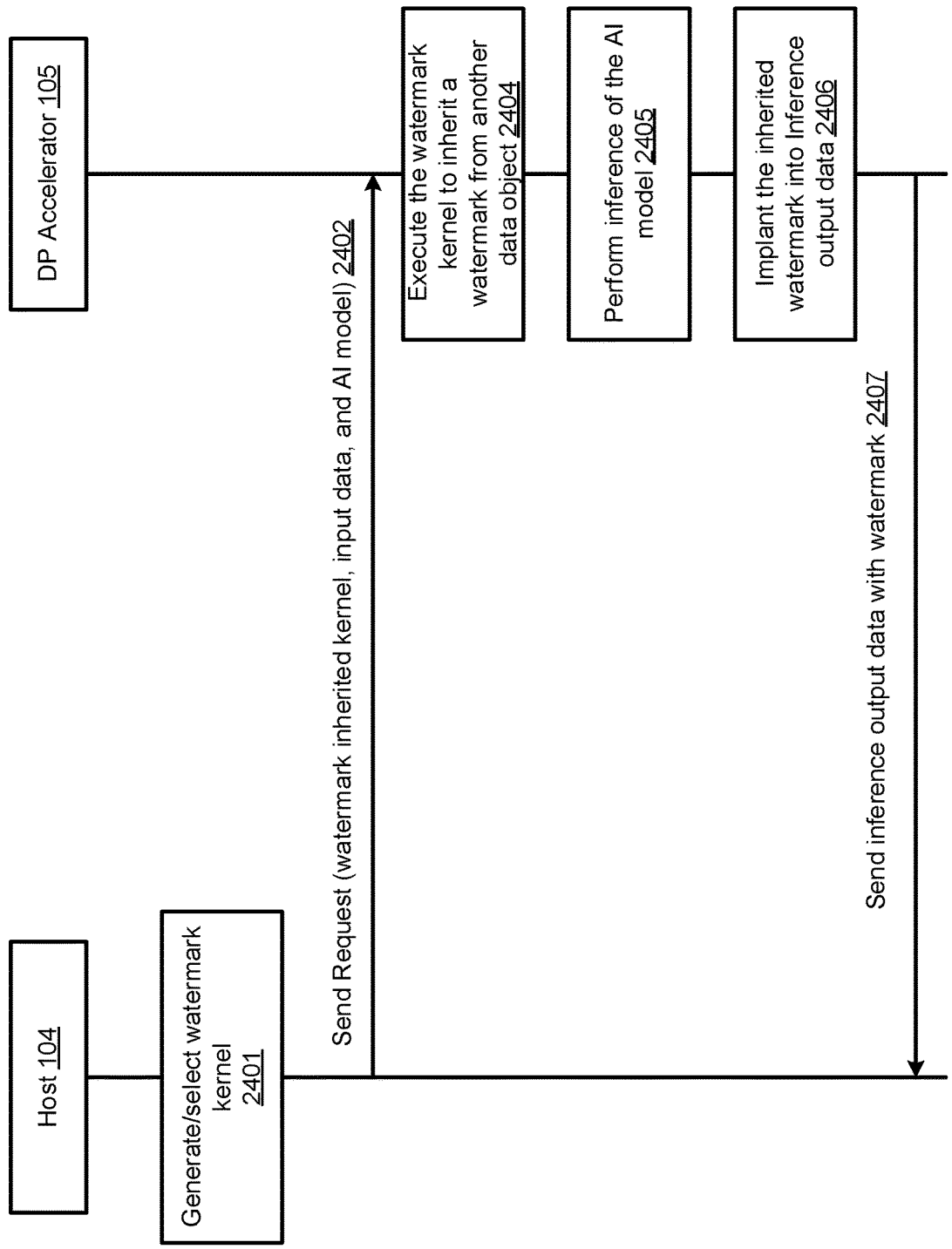
FIGS. 17-19 are a flow diagram illustrating a process of inheriting a watermark from a data object, performing an inference using an AI model, and implanting the inherited watermark into the inference of the AI model, according to another embodiment.

FIG. 17 is a processing flow diagram illustrating a processing flow of implanting a watermark in the inference output of an existing artificial intelligence (AI) model according to one embodiment. Referring to FIG. 17, at block 2401, host 104 generates a watermark kernel (e.g. watermark-inherited kernel) that is capable of inheriting a watermark. Host 104 sends the watermark kernel, an existing AI model, and a set of input data to DP accelerator 105 via path 2402. At block 2404, the watermark kernel inherits a watermark, either from the AI model or another data objet. At block 2405 the AI model is executed with the set of input data to perform an inference. At block 2406 the watermark kernel implants the inherited watermark within the inference output at block. The inference output data having the watermark implanted therein is transmitted back to host 104 via path 2407.

Figure 18:
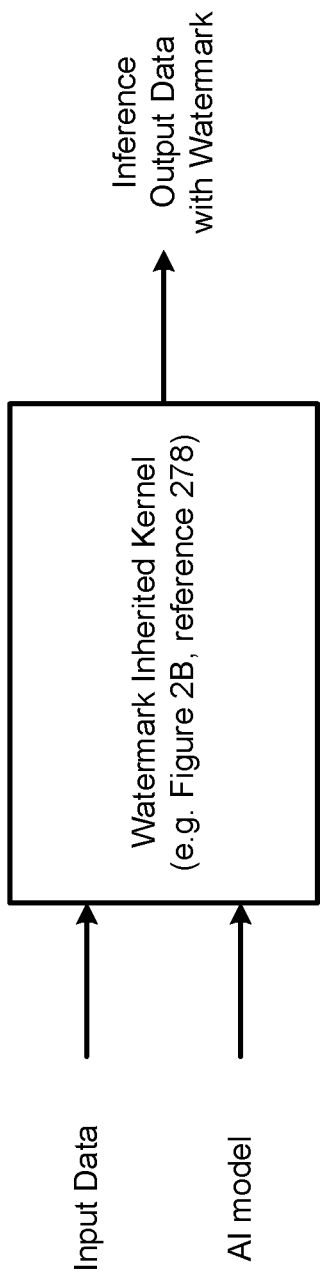

FIG. 18 is a flow diagram illustrating an example of a process of inheriting and implanting a watermark during the inference of an artificial intelligence (AI) model according to one embodiment. The process may be performed by processing logic which may include software, hardware, or a combination thereof. The watermark kernel (e.g. watermark-inherited kernel) is executed to generate a watermark by inheriting the watermark from an existing watermark or data object. The AI model is executed using the input data to generate inference output data from the AI model. The watermark is implanted into the inference output data, resulting in an AI model inference having the inherited watermark embedded in the inference.

Figure 19:
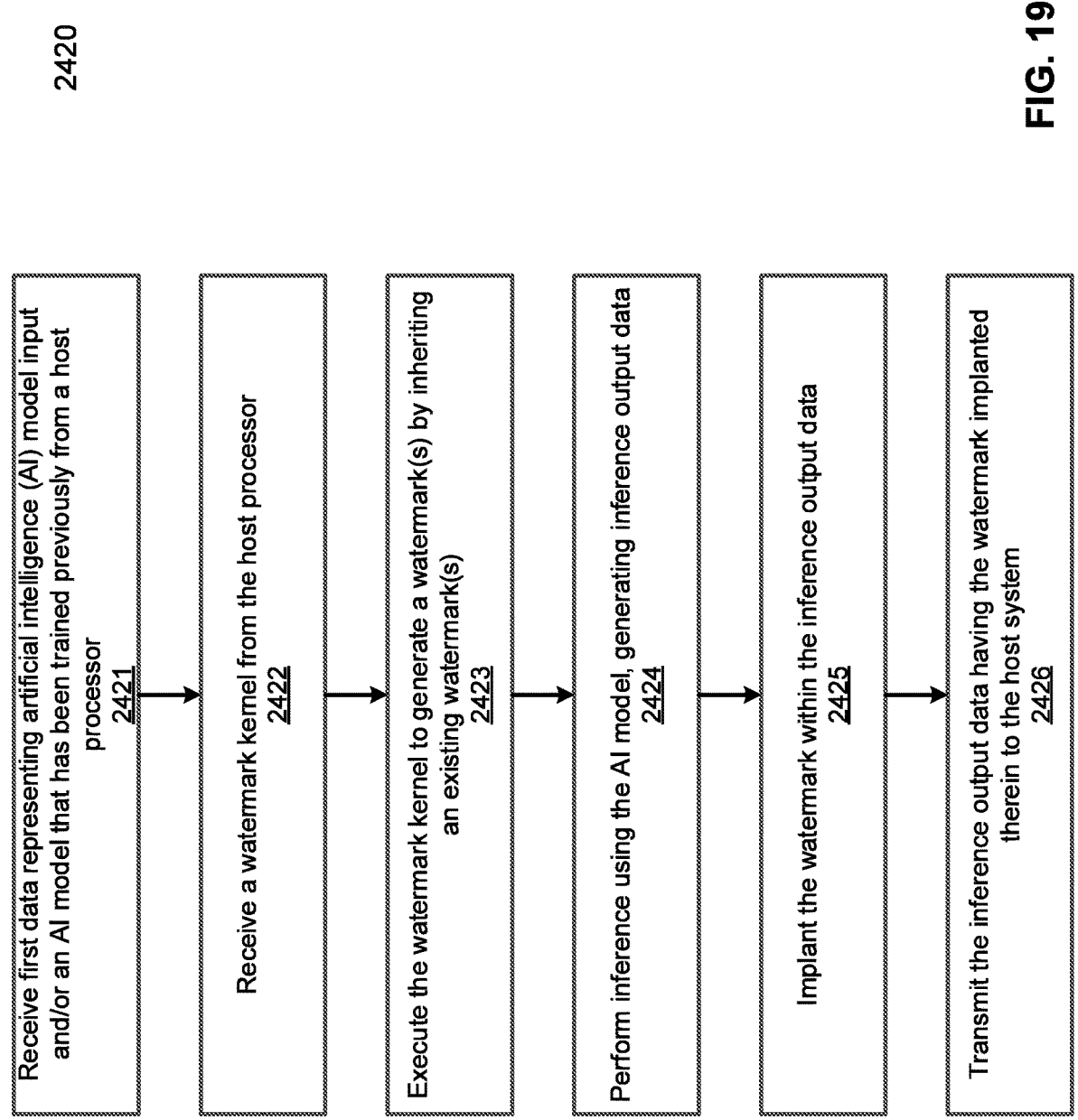

Referring now to FIG. 19, process 2420 illustrates a process of inheriting a watermark from a data object, performing an inference using an artificial intelligence (AI) model, and implanting the inherited watermark into the inference of the AI model. At block 2421, a DP accelerator 105 receives an AI model that has been previously trained and a set of input data from a host system 104 over a communication link 215. At block 2422, the DP accelerator 105 further receives a watermark kernel from the host system 104, where the watermark kernel is capable of inheriting a watermark from a data object. At block 2423, the watermark kernel is executed within the DP accelerator 105 to generate a new watermark by inheriting an existing watermark. At block 2424, an artificial intelligence inference is performed using the AI model received from the host system 104, generating inference output data. At block 2425, the watermark is implanted within the inference output data. The output data having the watermark implanted therein is transmitted back to the host 104 at block 2426.

With respect to any of the above aspects, in one embodiment, a watermark may be embedded in one or more nodes of one or more layers of an artificial intelligence model. For example, a watermark may be implanted in one or more weight variables or bias variables. Alternatively, one or more nodes (e.g., fake nodes that are not used or unlikely used by the artificial intelligence model) may be created to implant or store the watermark. A host processor may be a central processing unit (CPU) and a DP accelerator may be a general-purpose processing unit (GPU) coupled to the CPU over a bus or interconnect. A DP accelerator may be implemented in a form of an application-specific integrated circuit (ASIC), a field programmable gate array (FPGA) device, or other forms of integrated circuits (ICs). Alternatively, the host processor may be a part of a primary data processing system while a DP accelerator may be one of many distributed systems as secondary systems that the primary system can offload its data processing tasks remotely over a network (e.g., cloud computing systems such as a software as a service or SaaS system, or a platform as a service or PaaS system). A link between a host processor and a DP accelerator may be a peripheral component interconnect express (PCIe) link or a network connection such as Ethernet connection.

Figure 20:
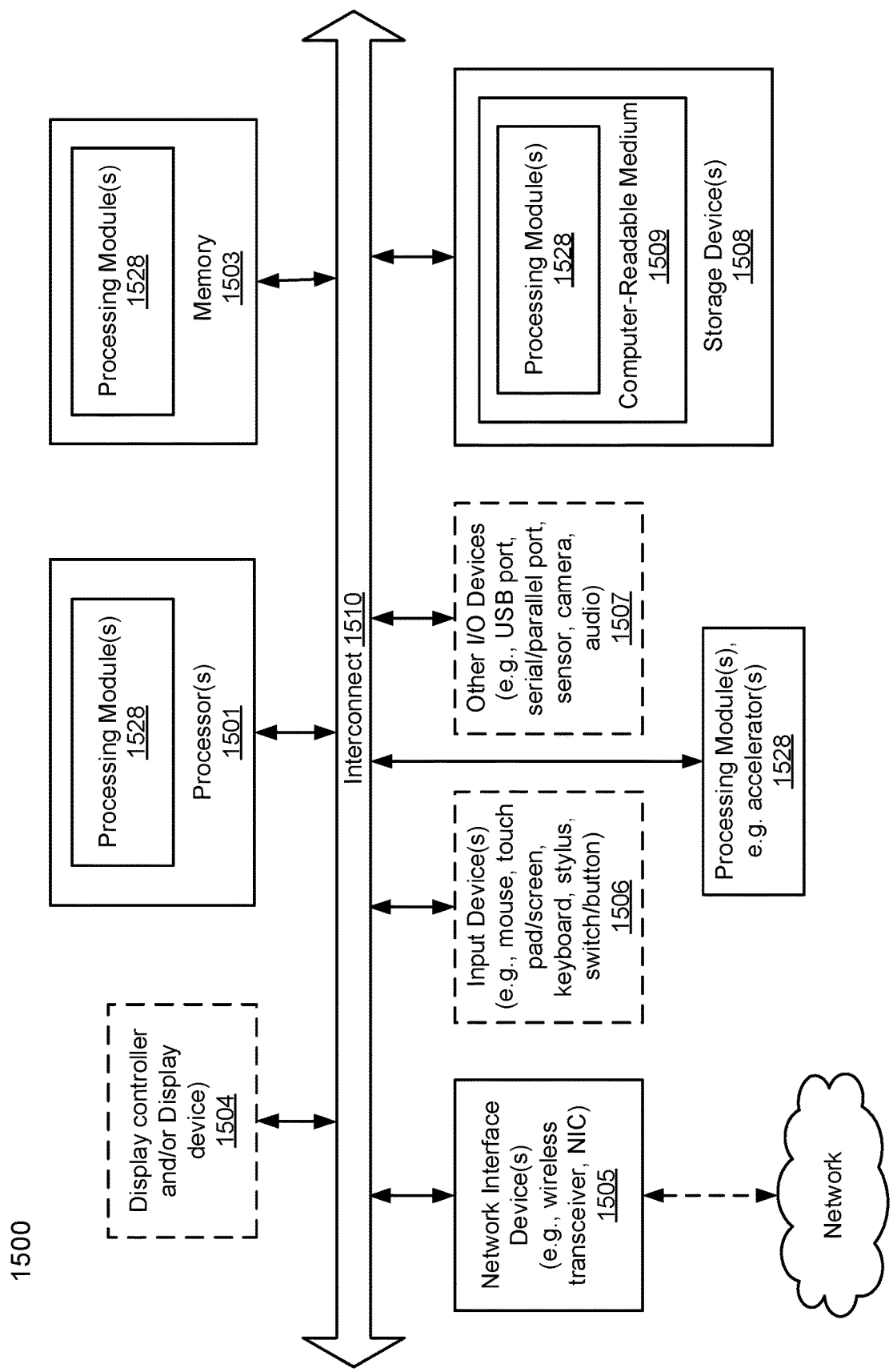
FIG. 20 is a block diagram illustrating an exemplary computing system for implementing the functionality disclosed herein.

FIG. 20 is a block diagram illustrating an example of a data processing system 1500 which may be used with one embodiment of the disclosure. For example, system 1500 may represent any of data processing systems described above performing any of the processes or methods described above, such as, for example, establishing secure communications between a host device 104 and data processing (DP) accelerator 105; running, by the DP accelerator, kernels of code of artificial intelligence (AI) models received from host device 104; executing applications on host device 104; executing API's and drivers on host device 104; running encryption/decryption logic, seed generators, encryption/decryption key generators, and the like, as described above for DP accelerator 105. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smart watch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as a Baidu® AI processor, a GPU, an ASIC, a cellular or baseband processor, an FPGA, a DSP, a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, user applications 205, runtime libraries 206, drivers 209 of host device 104, true random number generator 273, key manager 272, watermark unit 276, cryptographic engine 274 on DP accelerator 105. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some of the software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICs, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method performed by a data processing (DP) accelerator, the method comprising:
receiving, at the DP accelerator, first data representing a set of training data from a host processor;
receiving, at the DP accelerator, a watermark kernel from the host processor;
executing the watermark kernel within the DP accelerator on an artificial intelligence (AI) model, wherein the watermark kernel, when executed, is configured to:
generate a watermark,
train the AI model using the set of training data, and
implant the watermark within the AI model during training of the AI model; and
transmitting second data representing the trained AI model having the watermark implanted therein to the host processor.

2. The method of claim 1, further comprising receiving a pre-trained AI model, wherein the training is performed for the pre-trained AI model.

3. The method of claim 1, further comprising receiving a set of input data from the host processor, wherein the watermark kernel is executed on the set of input data, and wherein the watermark is generated based on the set of input data.

4. The method of claim 3, wherein the set of input data includes information describing the watermark.

5. The method of claim 1, wherein implanting the watermark in the AI model comprises embedding the watermark in one or more nodes of the AI model.

6. The method of claim 4, wherein the watermark is stored in one or more weight variables of the one or more nodes of the AI model.

7. The method of claim 4, wherein the watermark is stored in one or more bias variables of the one or more nodes of the AI model.

8. The method of claim 1, wherein implanting the watermark in the AI model comprises creating one or more additional nodes of the AI model during the training to store the watermark.

9. A data processing (DP) accelerator, comprising:
an interface to receive first data representing a set of training data and to receive a watermark kernel from a host processor; and
a kernel executor to execute the watermark kernel on an artificial intelligence (AI) model, wherein the watermark kernel, when executed, is configured to:
generate a watermark,
train the AI model using the set of training data, and
implant the watermark within the AI model during training of the AI model, wherein second data representing the trained AI model having the watermark implanted therein is transmitted to the host processor.

10. The DP accelerator of claim 9, the interface further configured to receive a pre-trained AI model, wherein the training is performed for the pre-trained AI model.

11. The DP accelerator of claim 9, wherein the interface is further to receive a set of input data from the host processor, wherein the watermark kernel is executed on the set of input data, and wherein the watermark is generated based on the set of input data.

12. The DP accelerator of claim 11, wherein the set of input data includes information describing the watermark.

13. The DP accelerator of claim 9, wherein implanting the watermark in the AI model comprises embedding the watermark in one or more nodes of the AI model.

14. The DP accelerator of claim 13, wherein the watermark is stored in one or more weight variables of the one or more nodes of the AI model.

15. The DP accelerator of claim 13, wherein the watermark is stored in one or more bias variables of the one or more nodes of the AI model.

16. The DP accelerator of claim 9, wherein implanting the watermark in the AI model comprises creating one or more additional nodes of the AI model during the training to store the watermark.

17. The DP accelerator of claim 9, wherein the receiving from, and transmitting to, the host processor is performed over a link that comprises a peripheral component interconnect express (PCIe) channel.

18. A non-transitory machine-readable medium having instructions stored therein, which when executed by a data processing (DP) accelerator, cause the DP accelerator to perform operations, the operations comprising:
receiving, at the DP accelerator, first data representing a set of training data from a host processor;
receiving, at the DP accelerator, a watermark kernel from the host processor;
executing the watermark kernel within the DP accelerator on an AI model, wherein
the watermark kernel, when executed, is configured to generate a watermark,
train the AI model using the set of training data, and
implant the watermark within the AI model during training of the AI model; and
transmitting second data representing the trained AI model having the watermark implanted therein to the host processor.

19. The machine-readable medium of claim 18, wherein the operations further comprise receiving a set of input data from the host processor, wherein the watermark kernel is executed on the set of input data, and wherein the watermark is generated based on the set of input data.

20. The machine-readable medium of claim 19, wherein the set of input data includes information describing the watermark.

21. The machine-readable medium of claim 18, wherein implanting the watermark in the AI model comprises embedding the watermark in one or more nodes of the AI model.

* * * * *